US009643553B2

(12) United States Patent
Tamada et al.

(10) Patent No.: US 9,643,553 B2
(45) Date of Patent: May 9, 2017

(54) IMPACT ABSORBER

(71) Applicant: KYORAKU Co., Ltd., Kyoto (JP)

(72) Inventors: Teruo Tamada, Kanagawa (JP); Naoto Tani, Aichi (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 14/389,890

(22) PCT Filed: Mar. 21, 2013

(86) PCT No.: PCT/JP2013/057980
§ 371 (c)(1),
(2) Date: Oct. 1, 2014

(87) PCT Pub. No.: WO2013/150895
PCT Pub. Date: Oct. 10, 2013

(65) Prior Publication Data
US 2015/0061322 A1 Mar. 5, 2015

(30) Foreign Application Priority Data

Apr. 5, 2012 (JP) ................................. 2012-086899
Apr. 5, 2012 (JP) ................................. 2012-086900
(Continued)

(51) Int. Cl.
*B60R 21/04* (2006.01)
*B60R 19/18* (2006.01)
(Continued)

(52) U.S. Cl.
CPC .............. *B60R 19/18* (2013.01); *B60R 19/34* (2013.01); *F16F 7/12* (2013.01); *B29C 47/04* (2013.01);
(Continued)

(58) Field of Classification Search
CPC ......... B60R 19/18; B60R 19/34; B60R 21/04; B60R 21/0428; B60R 21/045;
(Continued)

(56) References Cited

U.S. PATENT DOCUMENTS 5,316,367 A * 5/1994 Enning ................ B62D 29/008
296/187.09
7,111,713 B2 * 9/2006 Tamada .................. B60R 19/18
188/371
(Continued)

FOREIGN PATENT DOCUMENTS

CN 1882457 A 12/2006
CN 102343878 A 2/2012
(Continued)

OTHER PUBLICATIONS

Search report from International Patent Appl. No. PCT/JP2013/057980, mail date is Jun. 18, 2013.
(Continued)

*Primary Examiner* — Thomas Irvin
(74) *Attorney, Agent, or Firm* — Greenblum & Bernstein, P.L.C.

(57) ABSTRACT

Provided is an impact absorber capable of effectively absorbing impact even if an impact receiving position deviates from a desired position. An impact absorber according to an aspect of the present disclosure has a front wall for receiving impact, a rear wall opposed to the front wall, and surrounding walls for connecting the circumferences of the front wall and the rear wall, wherein thin portions are formed at corner portions for connecting the front wall and the surrounding walls.

16 Claims, 35 Drawing Sheets

(30) Foreign Application Priority Data

Apr. 5, 2012 (JP) ................................ 2012-086901
Apr. 5, 2012 (JP) ................................ 2012-086902

(51) Int. Cl.

| | | |
|---|---|---|
| *F16F 7/12* | (2006.01) | |
| *B60R 19/34* | (2006.01) | |
| *F16F 7/00* | (2006.01) | |
| *B29C 47/04* | (2006.01) | |
| *B29L 31/58* | (2006.01) | |

(52) U.S. Cl.

CPC ... *B29K 2995/0091* (2013.01); *B29L 2031/58* (2013.01); *B60R 21/04* (2013.01); *B60R 21/0428* (2013.01); *B60R 2019/186* (2013.01); *B60R 2019/188* (2013.01); *F16F 7/003* (2013.01)

(58) Field of Classification Search

CPC ............ B60R 21/34; B60R 2021/0051; B60R 2021/343; F16F 7/12; F16F 7/003
USPC ........ 188/371, 377; 293/120, 121, 132, 133; 296/187.05, 146.6, 187.03, 187.09, 296/187.12

See application file for complete search history.

(56) References Cited

U.S. PATENT DOCUMENTS

| | | | | |
|---|---|---|---|---|
| 7,143,876 B2* | 12/2006 | Tamada | ................... | B60R 19/18 188/371 |
| 7,448,672 B2* | 11/2008 | Kawamoto | ............. | B60R 21/04 188/377 |
| 7,618,082 B2* | 11/2009 | Tamada | ................... | B60R 19/18 296/146.6 |
| 8,016,344 B2* | 9/2011 | Tamada | ................... | B60R 19/18 296/187.03 |
| 8,430,437 B2* | 4/2013 | Asakawa | ................. | B60R 19/34 293/132 |
| 2004/0113455 A1* | 6/2004 | Schmidt | ................. | B60J 5/0451 296/146.6 |
| 2004/0129518 A1* | 7/2004 | Tamada | ................... | B60R 19/18 188/377 |
| 2007/0210615 A1 | 9/2007 | Tamada | | |
| 2011/0109113 A1* | 5/2011 | Masada | ..................... | B60R 7/06 296/37.12 |
| 2012/0025547 A1 | 2/2012 | Haneda et al. | | |
| 2013/0154307 A1* | 6/2013 | Tamada | ................... | B60R 21/04 296/187.05 |
| 2014/0048367 A1* | 2/2014 | Tani | ....................... | B60J 5/0451 188/377 |

FOREIGN PATENT DOCUMENTS

| | | |
|---|---|---|
| JP | 57-122808 | 7/1982 |
| JP | 3-121206 | 12/1991 |
| JP | 2002-522286 | 7/2002 |
| JP | 2005-161882 | 6/2005 |
| JP | 2006-130936 | 5/2006 |
| JP | 2008-062879 | 3/2008 |
| JP | 2008-213577 | 9/2008 |
| JP | 2011-247385 | 12/2011 |
| JP | 2012-30619 | 2/2012 |

OTHER PUBLICATIONS

Office Action issued in China Counterpart Patent Appl. No. 201380029679.0, dated Jun. 30, 2015, along with an English translation thereof.

Office Action issued in Japan Counterpart Patent Appl. No. 2012-086899, dated Oct. 13, 2015, along with an English translation thereof.

Office Action issued in Japan Counterpart Patent Appl. No. 2012-086902, dated Oct. 13, 2015, along with an English translation thereof.

Office Action issued in Japan Counterpart Patent Appl. No. 2012-086900, dated Oct. 13, 2015, along with an English translation thereof.

* cited by examiner

FIG. 17
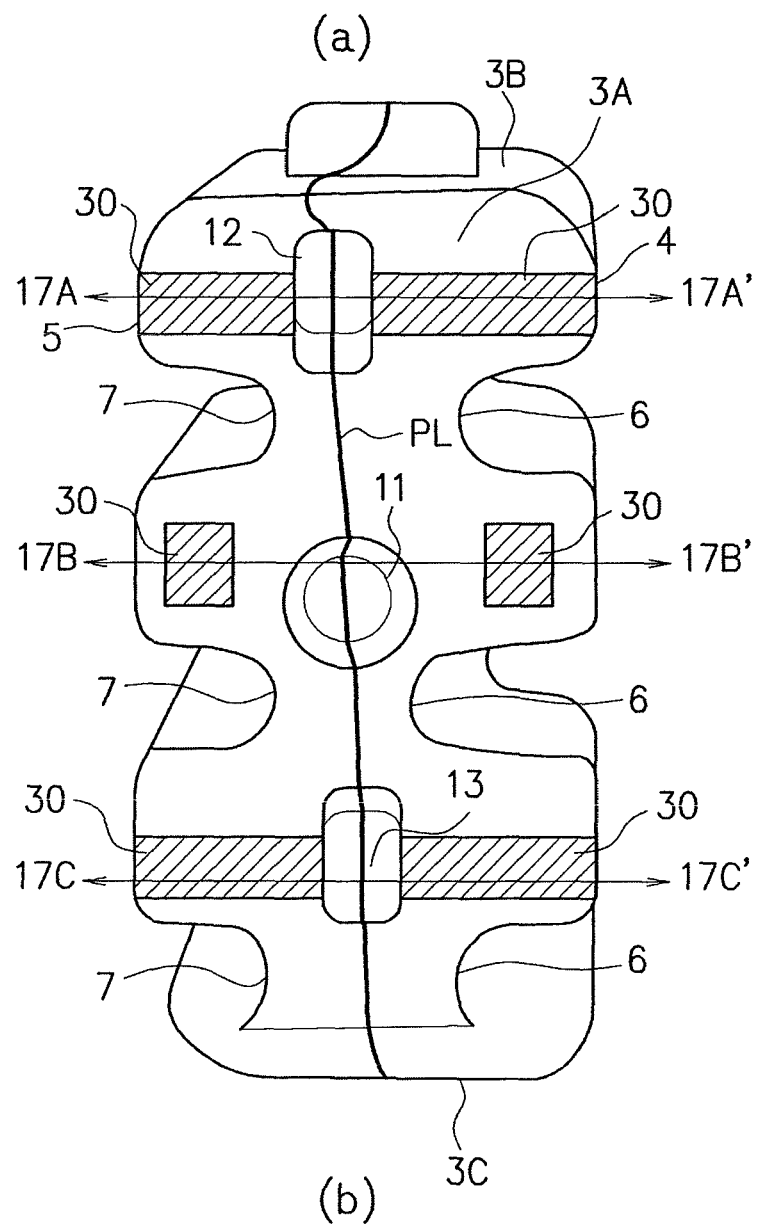
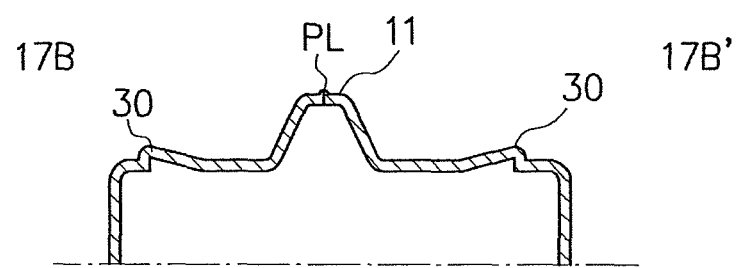

FIG. 18
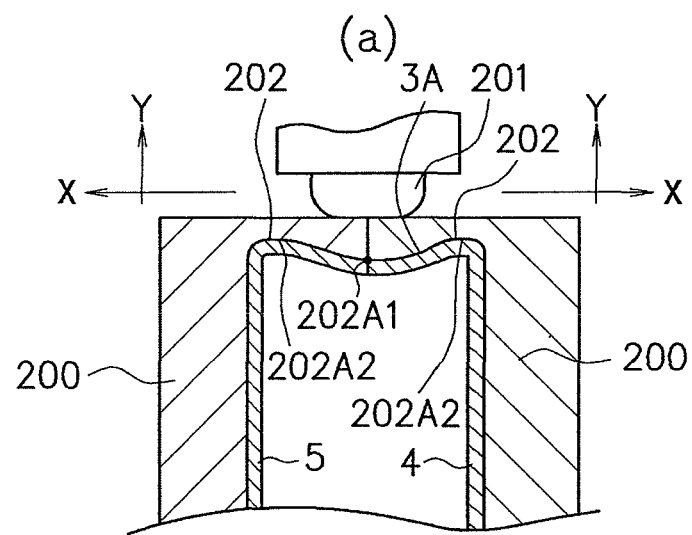
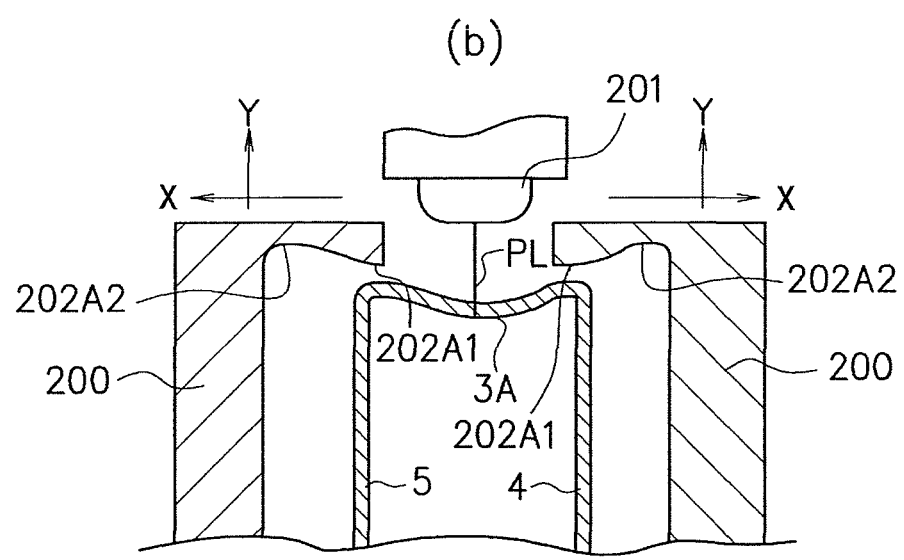

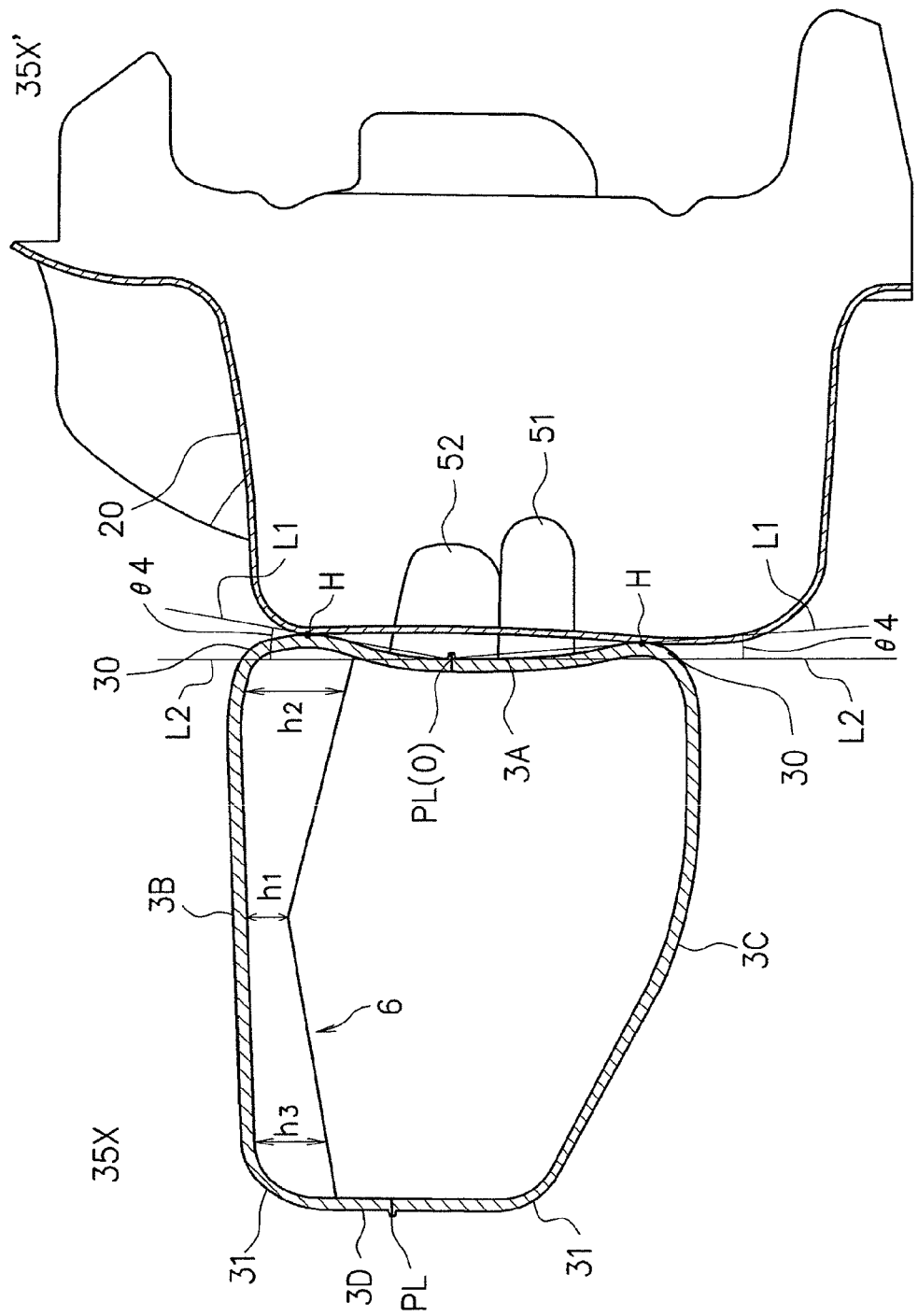

IMPACT ABSORBER

TECHNICAL FIELD

The present disclosure relates to an impact absorber, and more particularly, to an impact absorber suitable for knee bolsters, bumper absorbers, etc.

BACKGROUND ART

In a vehicle, such as an automobile, an impact absorber for absorbing impact is installed inside an installation space provided between an interior component with which an occupant is highly likely to make contact when a collision accident occurs and body components, such as various kinds of panels, located on the opposite side (back side) of the interior component from the vehicle compartment side and constituting part of the body. When the occupant makes contact with the interior component, for example, in a collision accident, this impact absorber moderates the impact applied to the occupant, thereby protecting the occupant. A knee bolster is taken as an example of this kind of impact absorber.

Furthermore, in recent years, a bumper structure has been designed, which is capable of decreasing the load applied to the legs of a pedestrian and reducing the damage value of the pedestrian in a vehicle-to-person accident, and a bumper absorber is taken as an example of an impact absorber to be used for this bumper structure. The bumper absorber is usually installed inside the installation space between a bumper fascia and a bumper reinforcement.

For example, as a technical document filed earlier than the present invention, Patent Document 1 (JP-T-2002-522286) discloses an expandable knee bolster.

In addition, Patent Document 2 (JP-A-2006-130936) discloses an impact absorber suitable for the doors, roof, bonnet, etc. of a vehicle.

Furthermore, Patent Document 3 (JP-A-2008-213577) discloses a bumper absorber disposed inside the bumper system of an automobile.

PRIOR ART REFERENCE

Patent Document

Patent Document 1: JP-T-2002-522286
Patent Document 2: JP-A-2006-130936
Patent Document 3: JP-A-2008-213577

SUMMARY OF INVENTION

Problems to be Solved by the Invention

Many of the above-mentioned impact absorbers are installed inside installation spaces so that, in the case that a vehicle has received impact, the impact absorbers can efficiently absorb the impact.

However, in such an impact absorber, the impact receiving portion thereof deviates from a desired position and the impact absorber cannot efficiently absorb the impact in some cases depending on the installation state of the impact absorber and the impact state of the vehicle.

Hence, it is required to develop an impact absorber in which, even if the impact receiving portion thereof deviates from the desired position, the impact absorber can effectively absorb the impact.

An object of the present disclosure is to provide an impact absorber in which, even if the impact receiving portion thereof deviates from the desired position, the impact absorber can effectively absorb the impact.

Means for Solving to the Problems

An impact absorber according to an aspect of the present disclosure has:
a front wall for receiving impact,
a rear wall opposed to the front wall,
surrounding walls for connecting the circumferences of the front wall and the rear wall, and
a parting line passing through the front wall and the rear wall, wherein
thin portions are formed at the corners for connecting the front wall and the surrounding walls.

Advantageous Effects of the Invention

With an aspect of the present disclosure, even if the impact receiving portion deviates from the desired position, the impact absorber can effectively absorb the impact.

BRIEF DESCRIPTION OF THE DRAWINGS

FIG. 17 is a view showing a configuration example of the rear wall 3A;

FIG. 18 is a view showing a configuration example of split molds 200 for molding the rear wall 3A;

FIG. 35 is a view showing a cross-sectional configuration example shown in FIG. 34, taken on line 35X-35X'.

DESCRIPTION OF THE EMBODIMENTS

Figure 2:
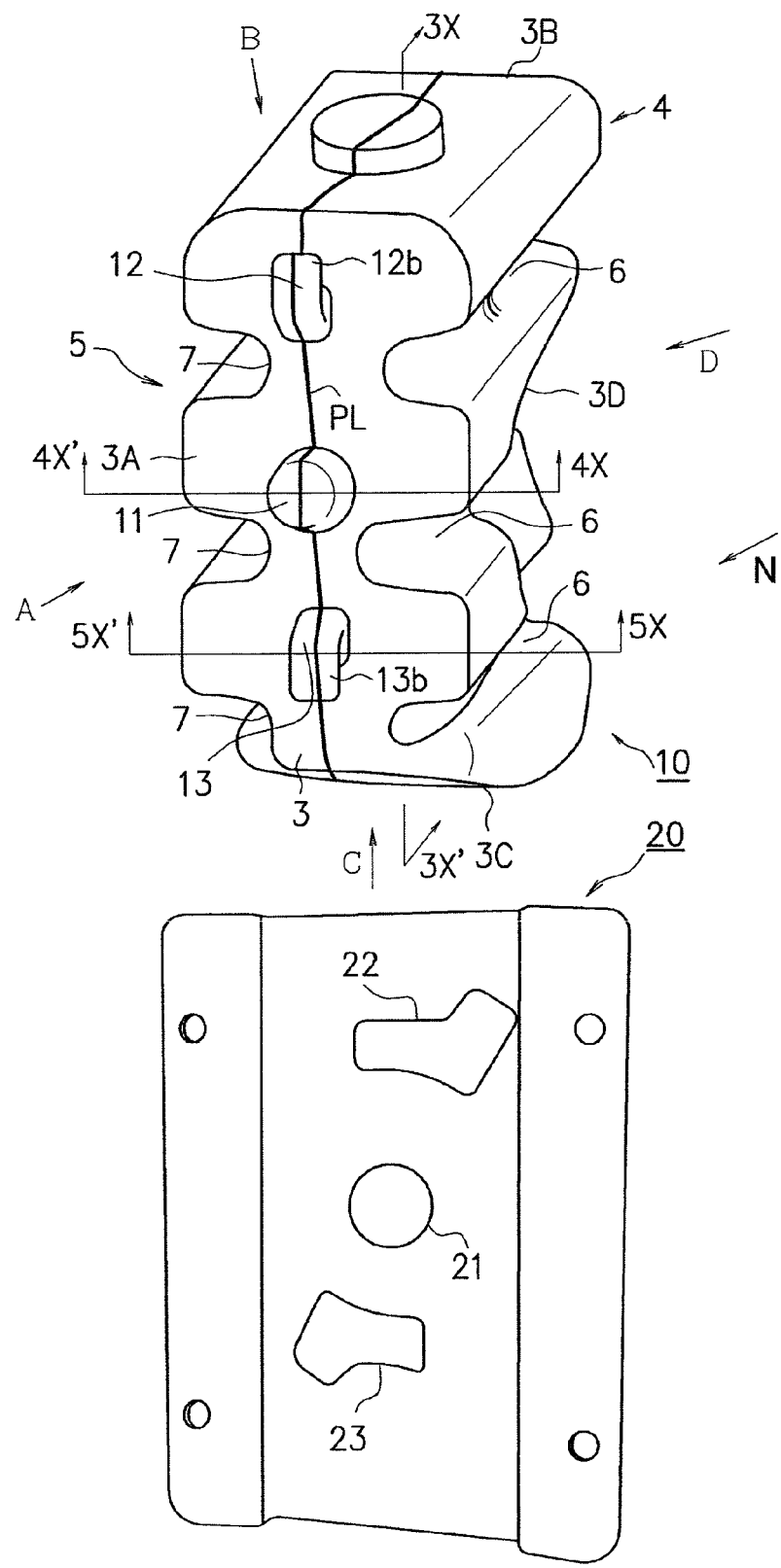
FIG. 2 is a view showing the overall configuration examples of the impact absorber 10 according to this embodiment and a mounting object 20 on which the impact absorber 10 is mounted.
Figure 3:
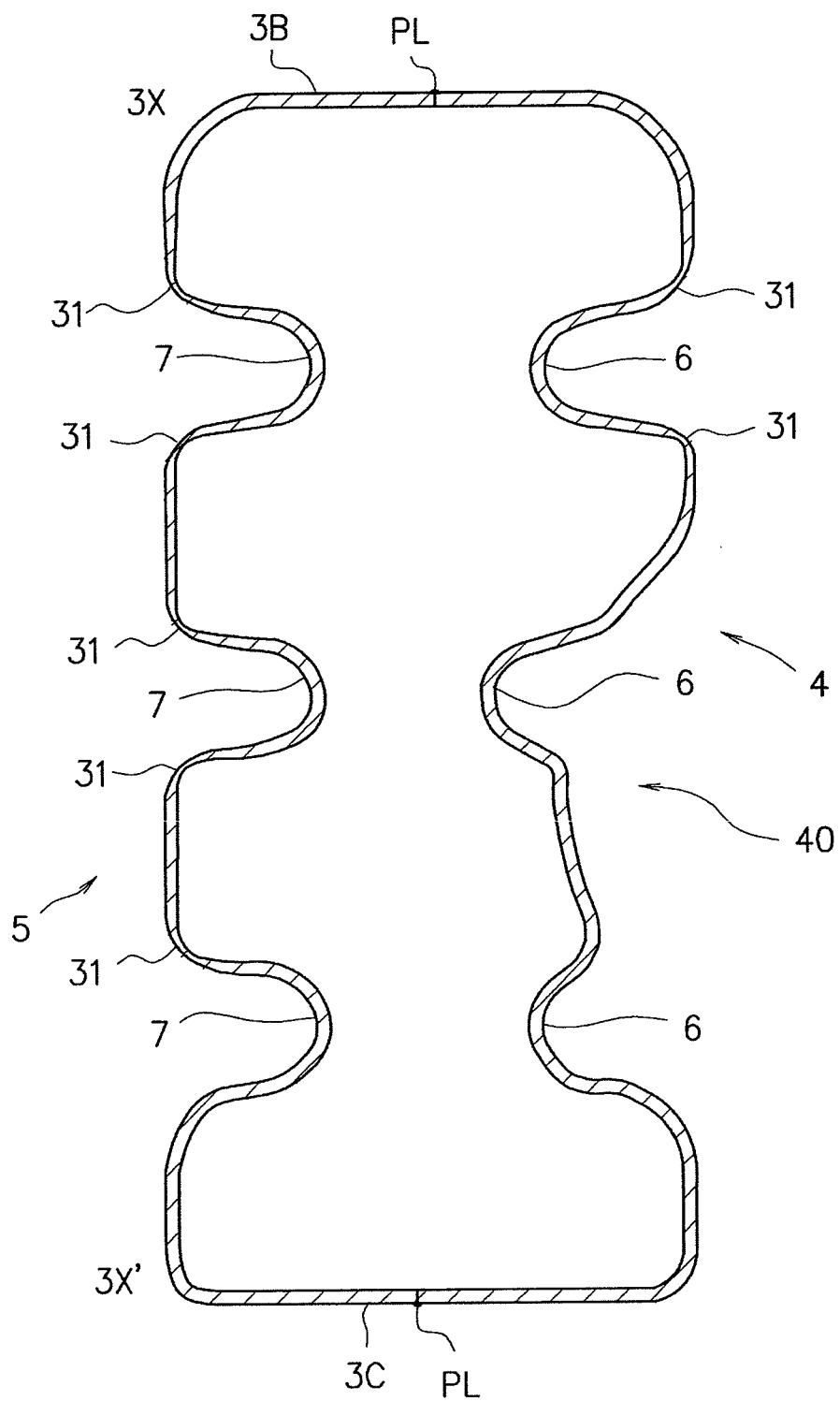
FIG. 3 is a view showing a cross-sectional configuration example of the impact absorber 10 shown in FIG. 2, taken on line 3X-3X'.
Figure 4:
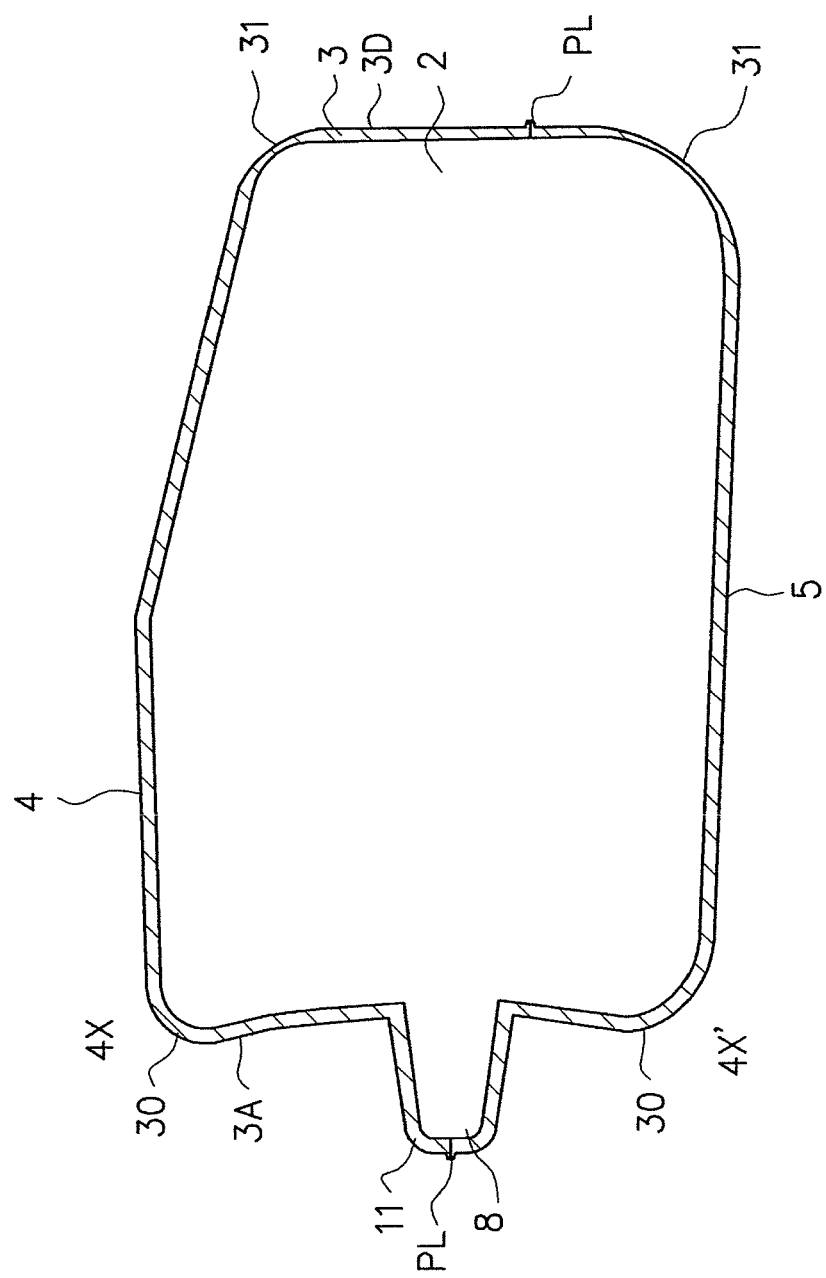
FIG. 4 is a view showing a cross-sectional configuration example of the impact absorber 10 shown in FIG. 2, taken on line 4X-4X'.

General Description of an Embodiment of an Impact Absorber 10 According to an Aspect of the Present Disclosure First, the general description of an impact absorber 10 according to an aspect of the present disclosure will be given referring to FIGS. 2 to 4. FIG. 2 is a view showing the overall configuration examples of the impact absorber 10 according to an aspect of the present disclosure and a mounting object 20 on which the impact absorber 10 is mounted. FIG. 3 is a view showing a cross-sectional configuration example of the impact absorber 10 shown in FIG. 2, taken on line 3X-3X', and FIG. 4 is a view showing a cross-sectional configuration example of the impact absorber 10 shown in FIG. 2, taken on line 4X-4X'.

The impact absorber 10 according to the aspect of the present disclosure is configured so as to have a front wall 3D for receiving impact, a rear wall 3A opposed to the front wall 3D, surrounding walls (corresponding to an upper wall 3B, a first side wall 4, a lower wall 3C and a second side wall 5) for connecting the circumferences of the front wall 3D and the rear wall 3A, and a parting line PL passing through the front wall 3D and the rear wall 3A. Furthermore, as shown in FIG. 4, thin portions 31 are formed at the corner portions for connecting the front wall 3D to the surrounding walls (the first side wall 4 and the second side wall 5). Moreover, as shown in FIG. 2, groove-shaped ribs 6 and 7 extending from the front wall 3D toward the rear wall 3A are formed on the surrounding walls (the first side wall 4 and the second side wall 5), and as shown in FIG. 3, the thin portions 31 are formed at the groove-shaped ribs 6 and 7.

Hence, even if the impact receiving portion of the impact absorber 10 deviates from a desired position, the thin portions 31 of the wall portions constituting the impact absorber 10 preferentially buckle. As a result, even if the impact receiving portion of the impact absorber 10 deviates from the desired position, the impact absorber 10 can effectively absorb the impact. The impact absorber 10 according to the aspect of the present disclosure will be described referring to the accompanying drawings.

First Embodiment

<Mounting Example of the Impact Absorber 10>

Figure 1:
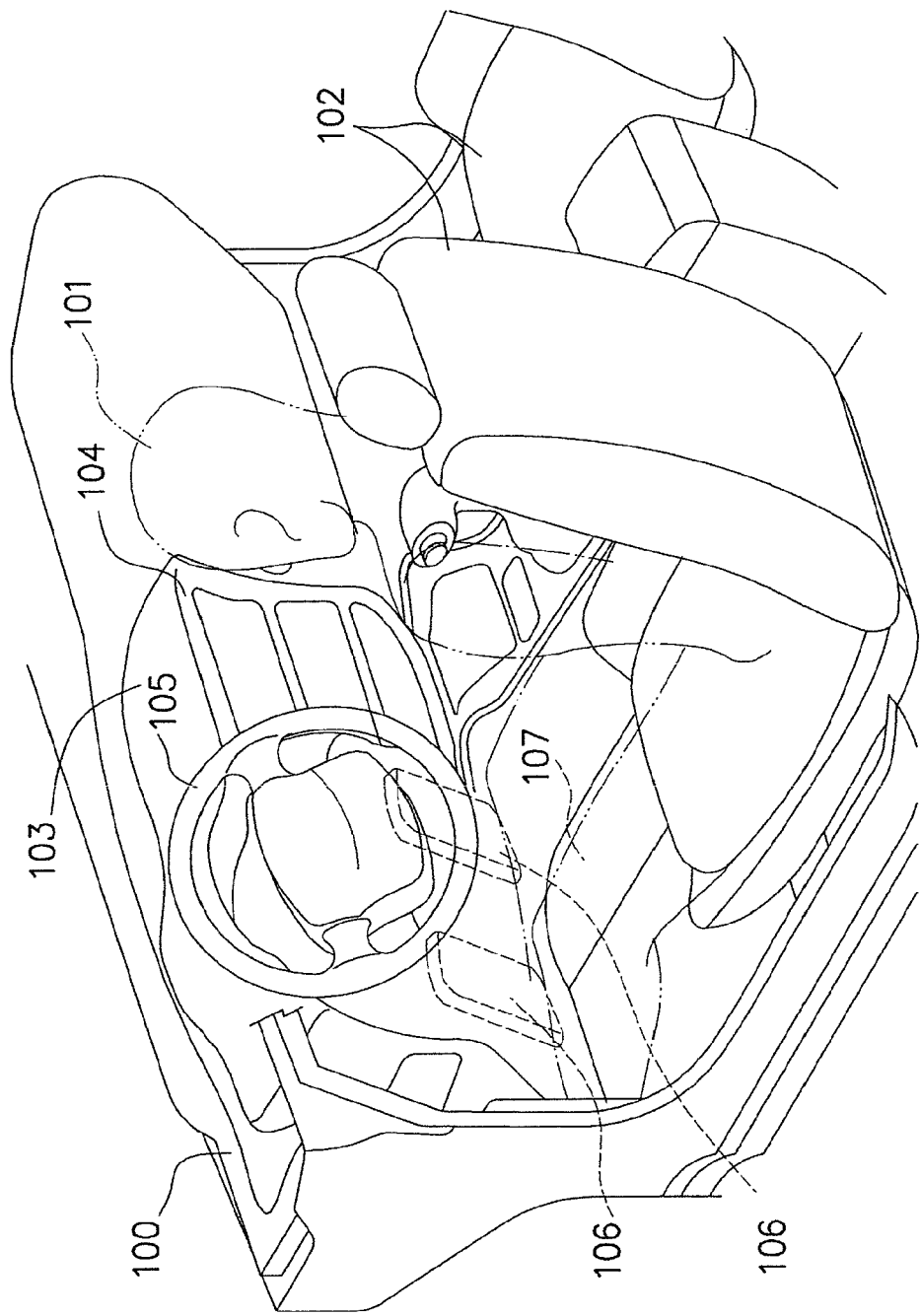
FIG. 1 shows a state in which an impact absorber 10 according to this embodiment is mounted on an automobile 100 as the impact absorber of a knee bolster 106.

First, a mounting example of the impact absorber 10 according to the present disclosure will be described referring to FIG. 1. FIG. 1 shows a state in which the impact absorber 10 shown in FIGS. 2 to 11 is mounted on an automobile 100 as the impact absorber of a knee bolster 106.

The automobile 100 shown in FIG. 1 is configured so as to have an occupant vehicle compartment 103 equipped with front seats 102 for occupants including a driver 101, and a meter 104 is positioned in the wall on the side of a steering wheel 105. The steering wheel 105 is connected to a steering column (not shown), and a steering support member for supporting the steering column is provided in the width direction of the vehicle while being supported by the wall faces of the vehicle body.

The impact absorbers 10 (see FIGS. 2 to 11) according to this embodiment are mounted as the knee bolsters 106 on the side of the driver's seat on both sides across the steering column. However, since the spaces on both sides of the steering column are vertically long due to the relationship with the installation spaces of the other vehicle components (the meter 104, navigation apparatus, air conditioning equipment, etc.), the knee bolsters 106 are installed so as to be adjacent to the respective knees 107 of the driver 101 in the vertically long spaces. Hence, in the case that the automobile 100 is subjected to impact, the knees 107 of the driver 101 make contact with the respective knee bolsters 106, the knee bolsters 106 absorb the impact and reduce the impact applied to the knees 107. Although the knee bolsters 106 on the side of the driver's seat are shown in FIG. 1, the knee bolsters can also be mounted on the side of the front passenger's seat in a way similar to the side of the driver's seat so as to be adjacent to the knees 107 of the occupant sitting on the front passenger's seat.

<Configuration Example of the Impact Absorber 10>

Figure 5:
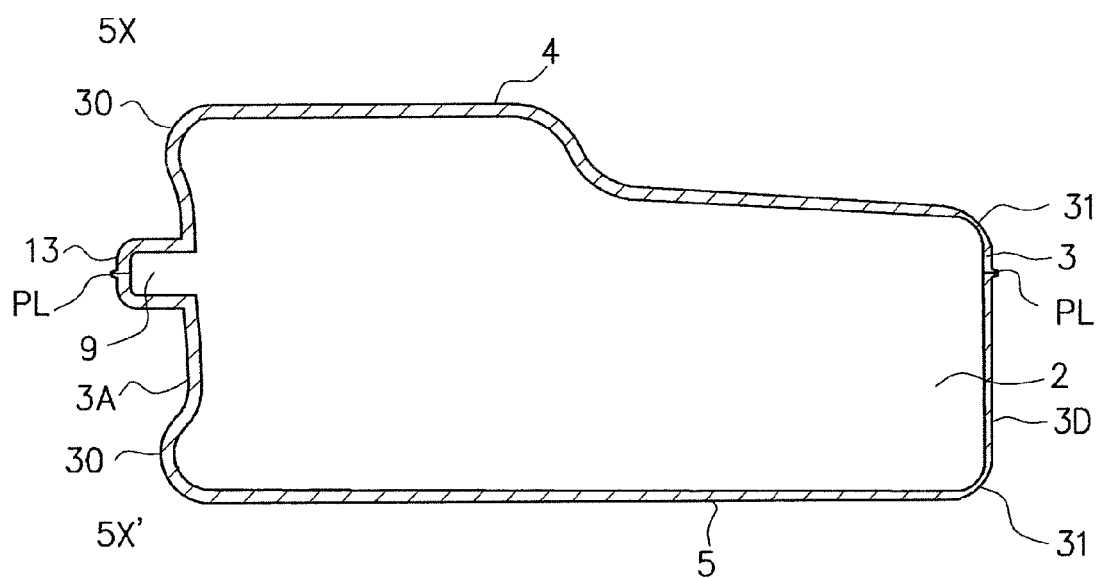
FIG. 5 is a view showing a cross-sectional configuration example of the impact absorber 10 shown in FIG. 2, taken on line 5X-5X'.
Figure 6:
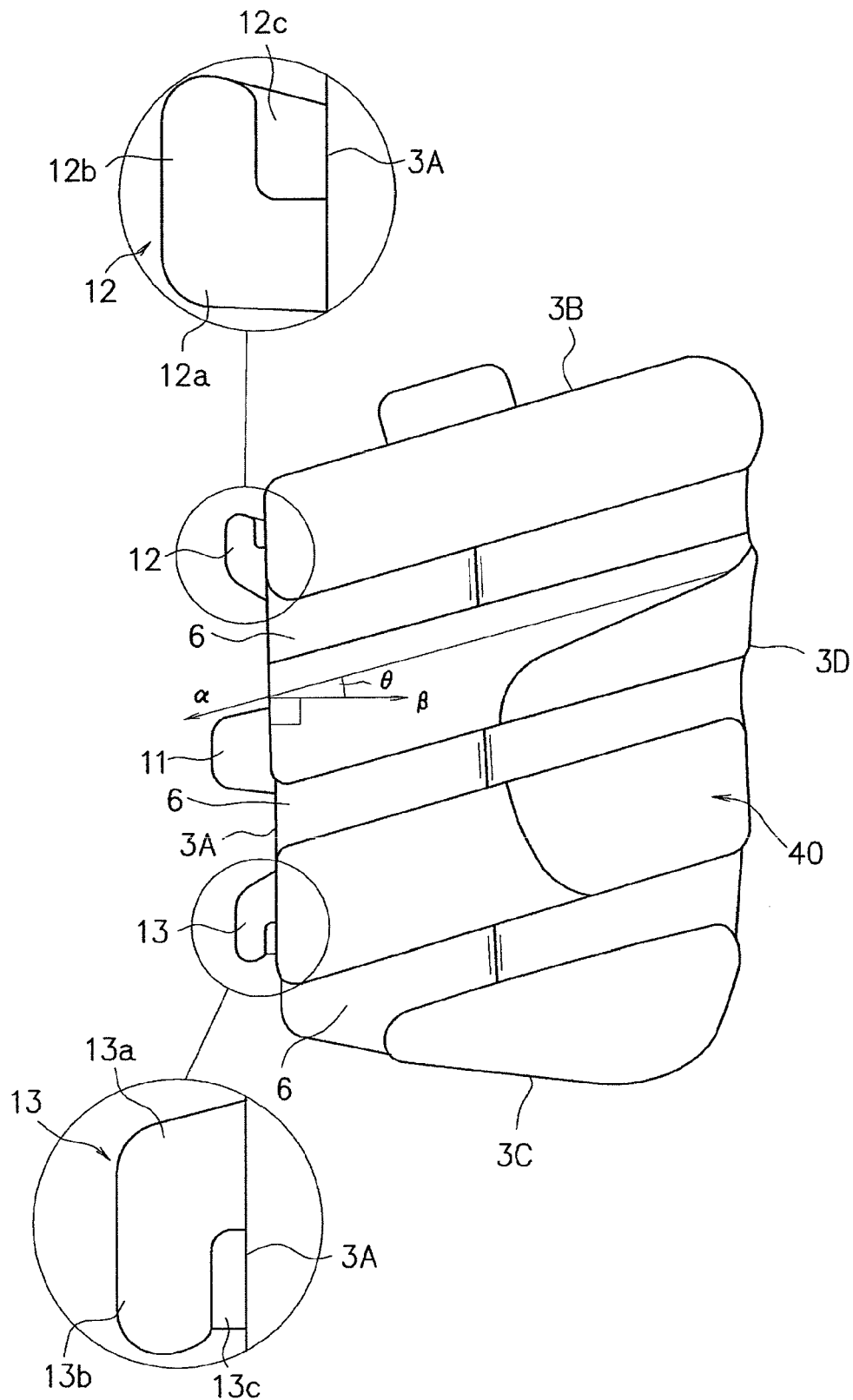
FIG. 6 is a view showing a configuration example of the impact absorber 10 shown in FIG. 2 on the side of the first side wall 4.
Figure 7:
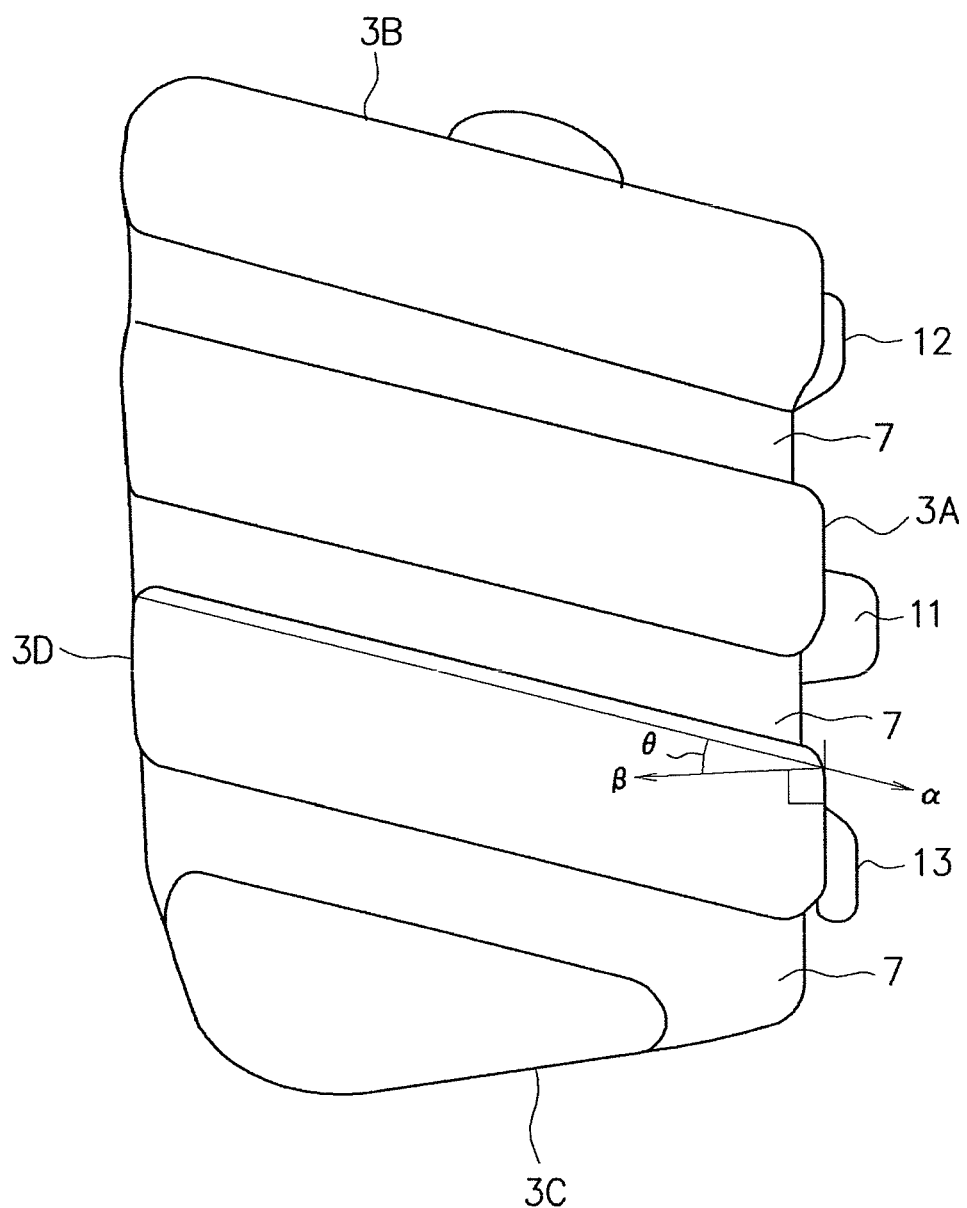
FIG. 7 is a view showing a configuration example of the impact absorber 10 shown in FIG. 2 on the side of the second side wall 5.
Figure 8:
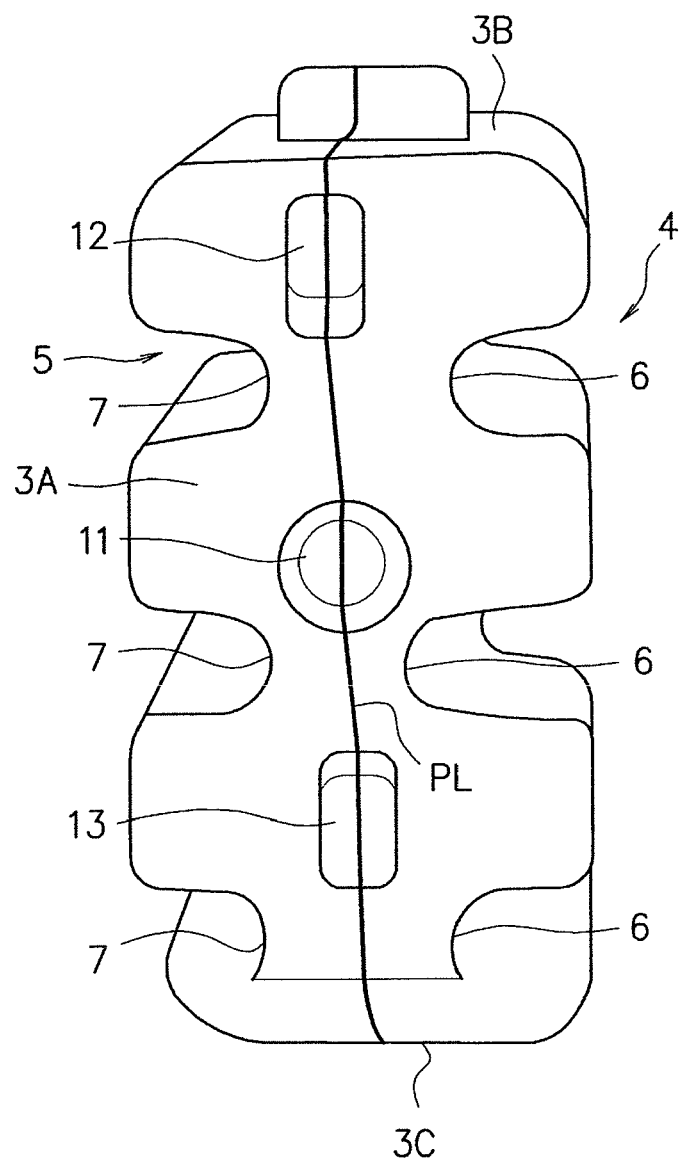
FIG. 8 is a view showing a configuration example of the impact absorber 10 shown in FIG. 2 on the side A (on the side of the rear wall 3A)
Figure 9:
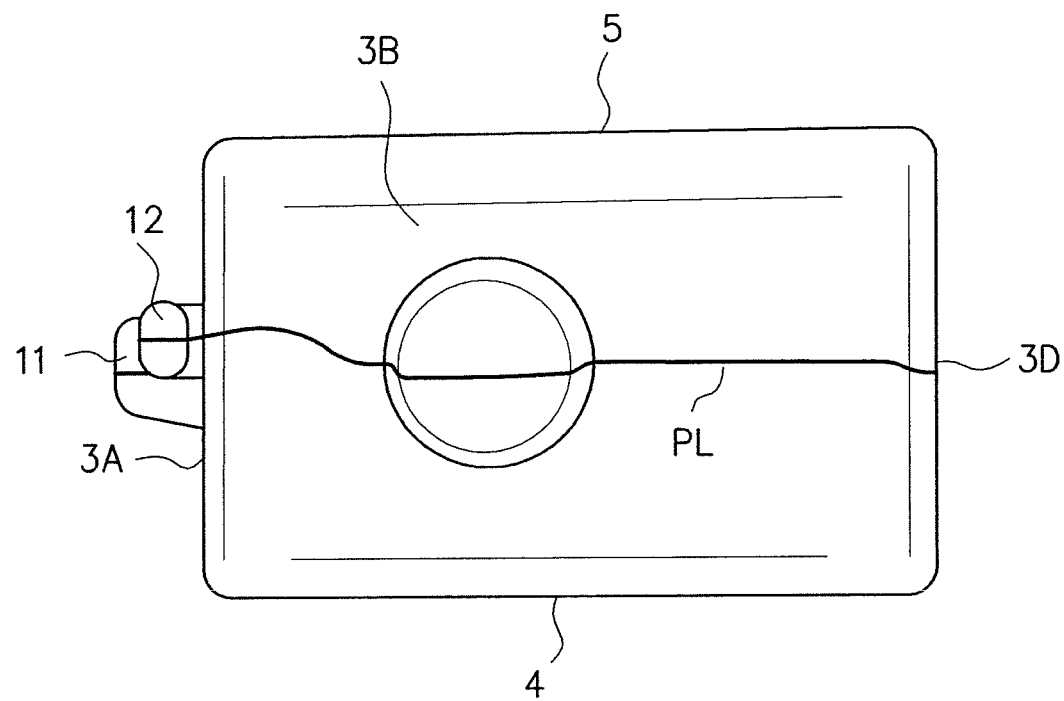
FIG. 9 is a view showing a configuration example of the impact absorber 10 shown in FIG. 2 on the side B (on the side of the upper wall 3B)
Figure 10:
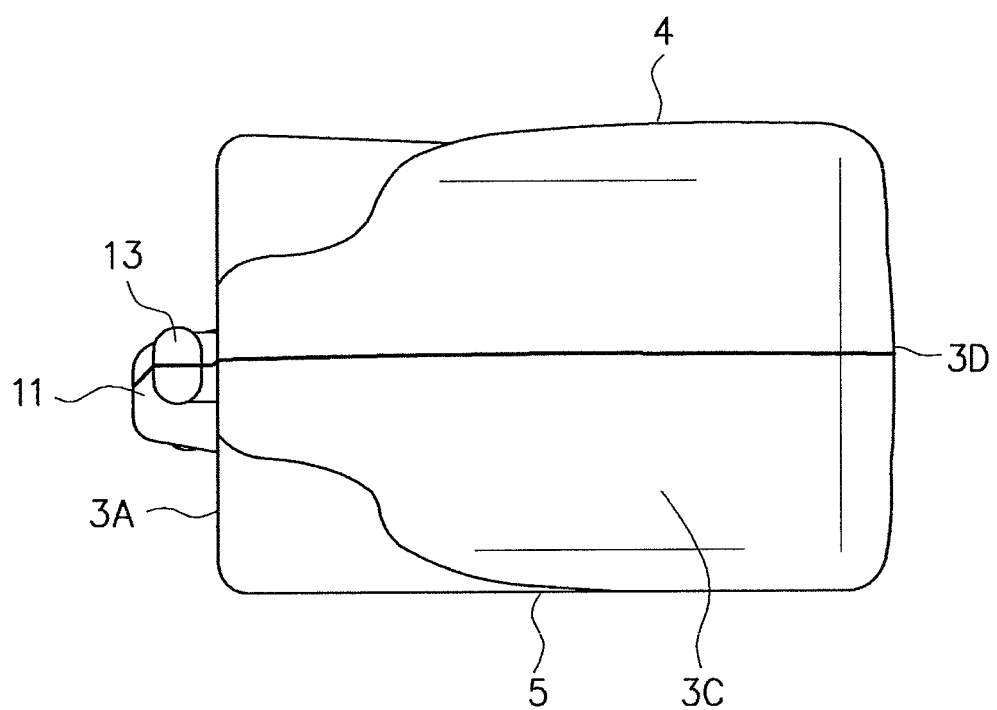
FIG. 10 is a view showing a configuration example of the impact absorber 10 shown in FIG. 2 on the side C (on the side of the lower wall 3C)
Figure 11:
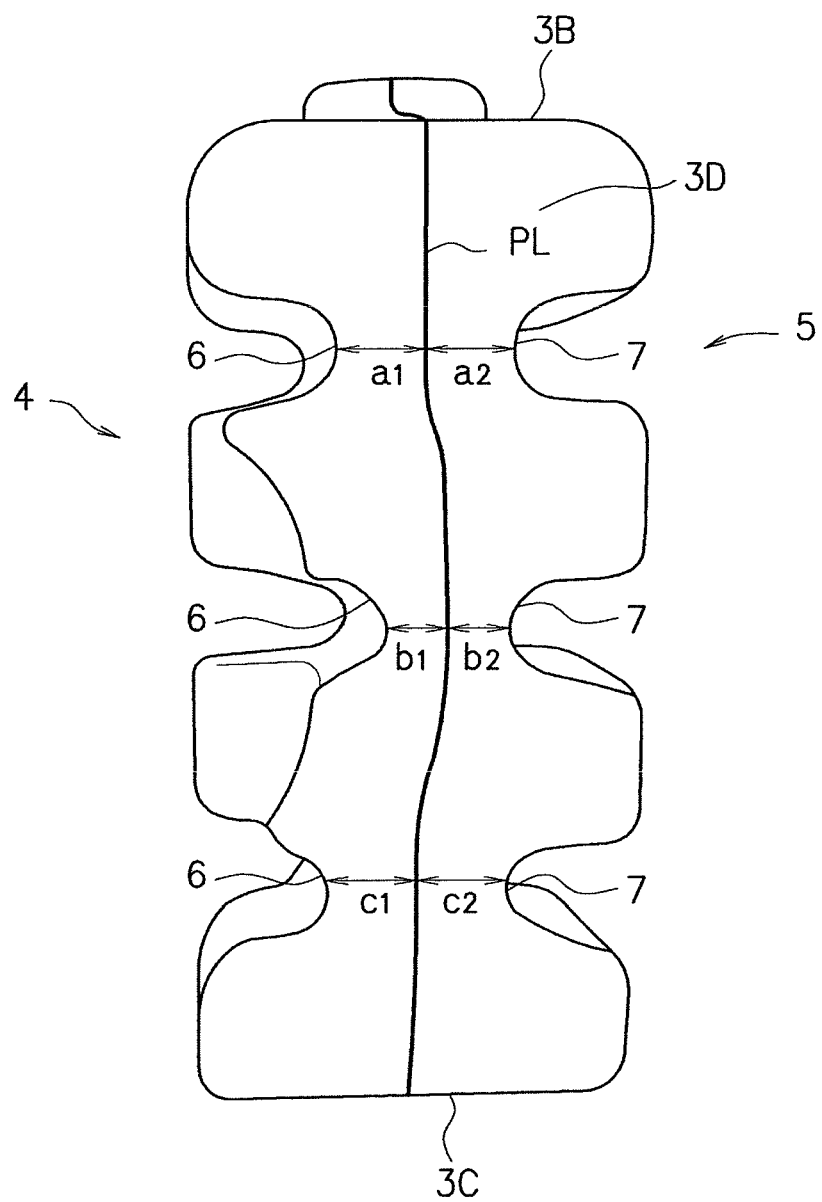
FIG. 11 is a view showing a configuration example of the impact absorber 10 shown in FIG. 2 on the side D (on the side of the front wall 3D)

Next, the configuration example of the impact absorber 10 according to this embodiment will be described referring to FIGS. 2 to 11. FIG. 2 is a view showing the overall configuration examples of the impact absorber 10 according to this embodiment and the mounting object 20 on which the impact absorber 10 is mounted, FIG. 3 is a view showing a cross-sectional configuration example of the impact absorber 10 shown in FIG. 2, taken on line 3X-3X', FIG. 4 is a view showing a cross-sectional configuration example of the impact absorber 10 shown in FIG. 2, taken on line 4X-4X', and FIG. 5 is a view showing a cross-sectional configuration example of the impact absorber 10 shown in FIG. 2, taken on line 5X-5X'. FIG. 6 is a view showing a configuration example of the impact absorber 10 shown in FIG. 2 on the side of the first side wall 4, and FIG. 7 is a view showing a configuration example of the impact absorber 10 shown in FIG. 2 on the side of the second side wall 5. FIG. 8 is a view showing a configuration example of the impact absorber 10 shown in FIG. 2 on the side A (on the side of the rear wall 3A), and FIG. 9 is a view showing a configuration example of the impact absorber 10 shown in FIG. 2 on the side B (on the side of the upper wall 3B). FIG. 10 is a view showing a configuration example of the impact absorber 10 shown in FIG. 2 on the side C (on the side of the lower wall 3C), and FIG. 11 is a view showing a configuration example of the impact absorber 10 shown in FIG. 2 on the side D (on the side of the front wall 3D). In this embodiment, the mounting object 20 made of sheet metal will be described. However, the material of the mounting object 20 is not limited to sheet metal, but any material can be applied.

The impact absorber 10 according to this embodiment is made by subjecting a thermoplastic resin to blow molding so as to be formed into a hollow shape and has the plurality of groove-shaped ribs 6 and 7 in which the first side wall 4 and the second side wall 5 of the main body 3 having a hollow portion 2, opposed to each other, are formed so as to be dented to each other respectively as shown in FIG. 3. The groove-shaped ribs 6 and 7 formed on the first side wall 4 and the second side wall 5 extend from the front wall 3D toward the rear wall 3A as shown in FIG. 2; the direction of the extension is preferably the same as the impact direction N. The impact direction N is, for example, the direction of N shown in FIG. 2. Hence, the rigidity against the impact from the impact direction N can be raised.

The impact absorber 10 according to this embodiment is designed to receive impact at the front wall 3D shown in FIG. 11 and transmit the impact received at the front wall 3D to the mounting object 20 via the rear wall 3A opposed to the front wall 3D and shown in FIG. 8. In the impact absorber 10 according to this embodiment, the parting line PL extends in connection with the upper wall 3B, the front wall 3D, the lower wall 3C and the rear wall 3A, thereby enhancing the rigidity of the impact absorber 10. Hence, in the case that the front wall 3D receives impact, the impact absorber 10 can be made hardly broken.

In the case that the impact absorber 10 according to this embodiment is used as the above-mentioned knee bolster 106, the size of the impact absorber 10 becomes small, whereby the position (hitting position) of the load point subjected to impact is liable to deviate from an ideal position in the up-down direction or in the left-right direction, or the entering angle of the impact entering the front wall 3D is liable to deviate from an ideal entering angle in the up-down direction or in the left-right direction. The above-mentioned deviation occurs remarkably in the left-right direction than in the up-down direction. Hence, in the impact absorber 10 according to this embodiment, the parting line PL extends in connection with the upper wall 3B, the front wall 3D, the lower wall 3C and the rear wall 3A. As a result, even in the case that the front wall 3D receives impact in a state in which the above-mentioned deviation has occurred, the impact absorber 10 can be made hardly broken.

Furthermore, as shown in FIG. 11, on the front wall 3D, the parting line PL extends in connection with the upper end (on the side of the upper wall 3B) and the lower end (on the side of the lower wall 3C), thereby enhancing the rigidity of the front wall 3D. Hence, in the case that the front wall 3D receives impact, the front wall 3D can be made hardly broken.

Moreover, in the front wall 3D, the groove-shaped ribs 6 and 7 are provided so that the distances from the bottom portions of the groove-shaped ribs 6 and 7 to the parting line PL are equal (a1=a2, b1=b2, C1=c2). The distances from the bottom portions of the groove-shaped ribs 6 and 7 to the parting line PL are values measured in a state in which the lines connecting the bottom portions of the groove-shaped ribs 6 and 7 to the parting line PL are orthogonal. In the front wall 3D, the thicknesses of the groove-shaped ribs 6 and 7 can be made constant by making the distances (a1, b1, c1) from the bottom portions of the groove-shaped ribs 6 provided on the first side wall 4 to the parting line PL equal to the distances (a2, b2, c2) from the bottom portions of the groove-shaped ribs 7 provided on the second side wall 5 to the parting line PL. For this reason, even in the case that the position (hitting position) of the load point subjected to impact at the front wall 3D deviates from the ideal position or the entering angle of the impact entering the front wall 3D deviates from the ideal entering angle, a desired load can be maintained stably, and a desired impact absorption amount can be secured.

The shape of the parting line PL is not limited particularly but can be configured into arbitrary shapes, such as a linear shape and a curved shape, provided that the parting line satisfies the above-mentioned conditions and extends in connection with the upper end (on the side of the upper wall 3B) and the lower end (on the side of the lower wall 3C). However, in the impact absorber 10 according to this embodiment, since impact is received on the side of the front wall 3D and the mounting object 20 is mounted on the side of the rear wall 3A, it is preferable that the surface should be formed flat without leaving any compression portions CP at the parting line PL passing through the front wall 3D and the rear wall 3A and that the compression portion CP are left at the parting line PL passing through the upper wall 3B and the lower wall 3C. The compression portions CP can be formed by holding a thermoplastic resin between split molds and by melting the resin at the time of molding the impact absorber 10. As a result, breakage at the parting line PL can be prevented and stable impact absorption can be attained.

Furthermore, as shown in FIGS. 6 and 7, the groove-shaped ribs 6 and 7 extending from the front wall 3D toward the rear wall 3A are formed on the first side wall 4 and the second side wall 5 serving as the surrounding walls for connecting the front wall 3D and the rear wall 3A. The groove-shaped ribs 6 and 7 are formed on the first side wall 4 and the second side wall 5 so that a predetermined angle $\theta$ is formed between the extension direction $\alpha$ of the groove-shaped ribs 6 and 7 and the perpendicular direction $\beta$ perpendicular to the surface of the rear wall 3A. The predetermined angle θ is an angle at which the extension direction α of the groove-shaped ribs 6 and 7 is the same as the impact direction N when the rear wall 3A is mounted on the mounting object 20. The impact direction N is the direction of N shown in FIG. 2. Hence, in the case that the front wall 3D receives impact, while the rigidity against the impact is raised, the impact can be absorbed effectively at the groove-shaped ribs 6 and 7.

Although the groove-shaped ribs 6 and 7 having a slender shape are formed along the extension direction α as shown in FIGS. 6 and 7 in this embodiment, the ribs are not limited to the groove-shaped ribs 6 and 7 having a slender shape, and ribs having any shapes can be formed in the extension direction α. For example, the groove-shaped ribs 6 and 7 having a triangular shape or a trapezoidal shape can also be formed along the extension direction α. In this case, the shape of the groove-shaped rib 6 formed on the side of the first side wall 4 is preferably the same as that of the groove-shaped rib 7 formed on the side of the second side wall 5. With this configuration, the impact can be absorbed equally by the groove-shaped ribs 6 and 7 on both sides.

In addition, in this embodiment, the groove-shaped ribs 6 and 7 having a slender shape are formed continuously along the extension direction α. However, the groove-shaped ribs 6 and 7 can be formed intermittently (partially) in the extension direction α without forming the groove-shaped ribs 6 and 7 in part of the extension direction α. Also in this case, since the extension direction α of the groove-shaped ribs 6 and 7 is the same as the impact direction N, impact can be absorbed effectively by the groove-shaped ribs 6 and 7. However, it is preferable that the groove-shaped ribs 6 and 7 extending continuously in the extension direction α should be formed as in this embodiment. Hence, the groove-shaped ribs 6 and 7 continuously formed in the extension direction α can be bent so as to become convex in the direction approaching to the first side wall 4 and the second side wall 5 opposed to each other or in the direction away from the first side wall 4 and the second side wall 5 opposed to each other. As a result, an additional impact absorption effect can be produced.

Known resins are applicable as the thermoplastic resin constituting the impact absorber 10 according to this embodiment. The impact absorber can be made of resins having high mechanical strength, such as rigidity, for example, polyolefin resins, such as polyethylene and polypropylene; styrene resins, such as polystyrene and ABS resin; polyester resins, such as polyethylene terephthalate; polyamides; and the mixtures of these.

Furthermore, one or two or more kinds of additives being used in the field can be used, for example, fillers such as silica, pigments, dyes, heat stabilizers, light stabilizers, plasticizers, antistatic agents, flame-retardants, fire-proofing agents, aging preventing agents, ultraviolet absorbing agents, antioxidants, antifogging agents and lubricants, in such an range as not to deteriorate the mechanical strength (impact resistance).

As shown in FIG. 2, the impact absorber 10 according to this embodiment is configured so as to have a shaft portion 11 and come-off preventing portions 12 and 13 protruding from the rear wall 3A of the main body 3. The shaft portion 11 and the come-off preventing portions 12 and 13 constitute a mounting portion for mounting the impact absorber 10 on the mounting object 20. The main body 3 has six walls: the upper wall 3B, the rear wall 3A, the lower wall 3C, the front wall 3D, the first side wall 4 and the second side wall 5, and the upper wall 3B, the first side wall 4, the lower wall 3C and the second side wall 5 constitute the surrounding walls of the main body 3. As shown in FIG. 2, the impact absorber 10 according to the this embodiment is configured so as to be formed into a shape in which the distance between the upper wall 3B and the lower wall 3C is longer than the distance between the first side wall 4 and the second side wall 5.

Figure 12:
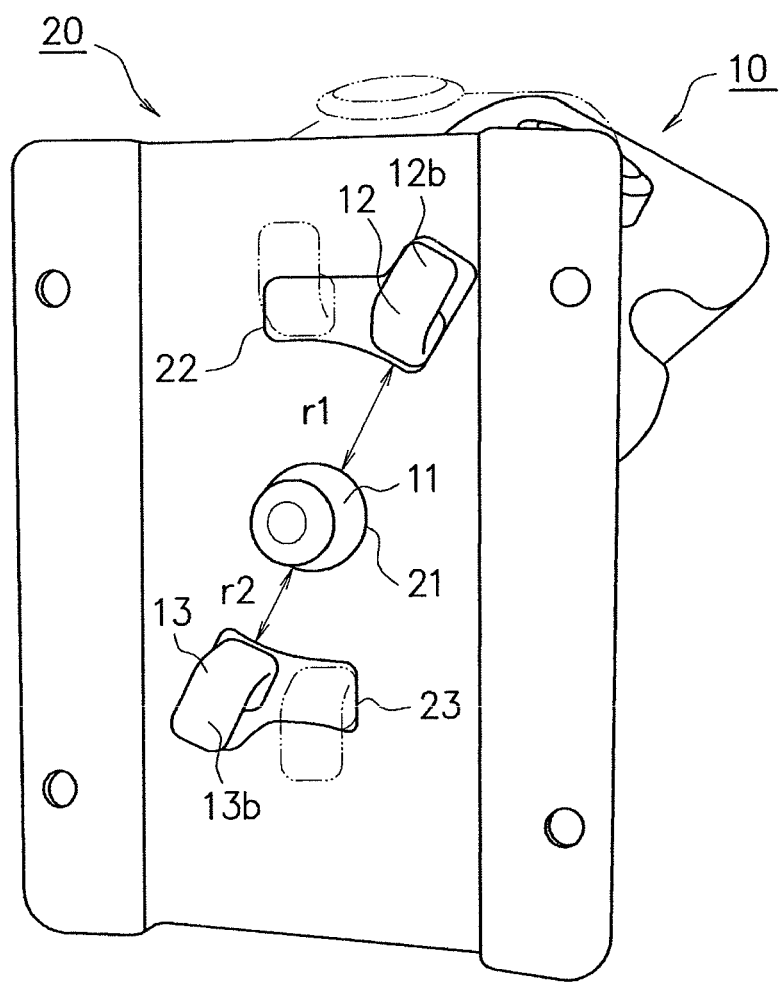
FIG. 12 is a view showing a state in which the shaft portion 11 and the come-off preventing portions 12 and 13 of a main body 3 are inserted into the shaft hole 21 and the mounting holes 22 and 23 provided in the mounting object 20.
Figure 13:
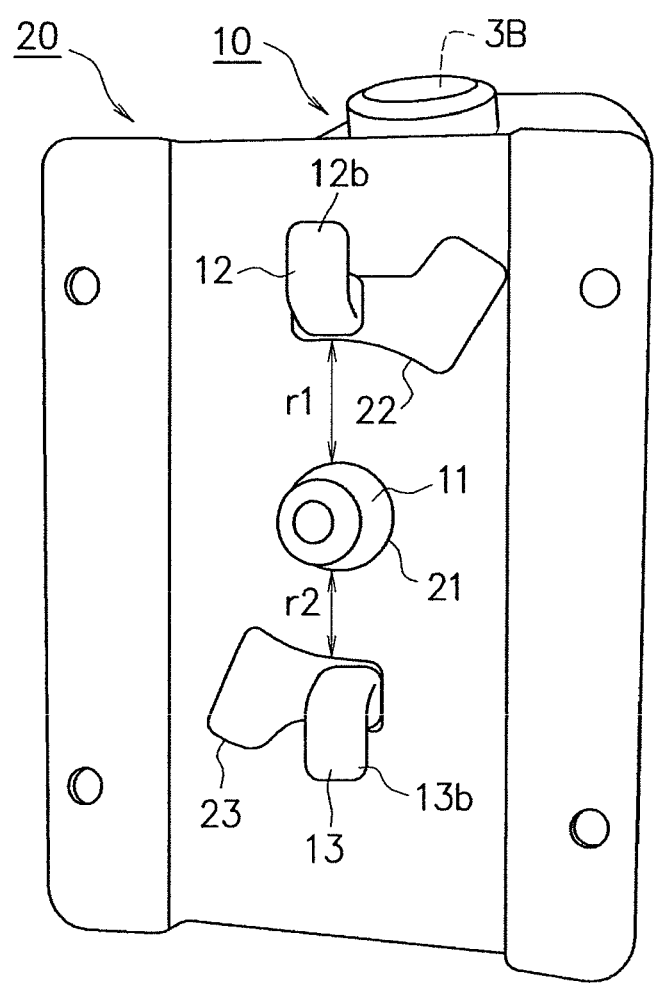
FIG. 13 is a view showing a state in which the main body 3 is rotated while the shaft portion 11 is used as a rotation shaft and the restricting portions 12b and 13b provided at the ends of the come-off preventing portions 12 and 13 are partially overlapped with the mounting object 20.

The shaft portion 11 is formed into a truncated cone shape as shown in FIG. 12 and is configured so that the shaft portion 11 is inserted into a shaft hole 21 provided in the mounting object 20 and corresponding to the shaft hole 21, whereby the main body 3 is rotated and moved with respect to the mounting object 20 while the shaft portion 11 is used as a rotation shaft as shown in FIG. 13. However, the shape of the shaft portion 11 is not limited to the truncated cone shape, and the shaft portion 11 can be formed into an arbitrary shape, such as a cylindrical shape, provided that the main body 3 can be rotated while the shaft portion 11 is used as a shaft.

Furthermore, the come-off preventing portions 12 and 13 are formed into a hook shape having a bent end portion; as shown in FIG. 12, the come-off preventing portions 12 and 13 are inserted into the mounting holes 22 and 23 provided in the mounting object 20 and corresponding to the come-off preventing portions 12 and 13; as shown in FIG. 13, when the main body 3 is rotated with respect to the mounting object 20 while the shaft portion 11 is used as a rotation shaft, the main body is moved while the mounting object 20 is held between part of the bottom face of each of the restricting portions 12b and 13b provided at the ends of the come-off preventing portions 12 and 13 and the surface of the main body 3, part of each of the restricting portions 12b and 13b provided at the ends of the come-off preventing portions 12 and 13 is overlapped with the mounting object 20, whereby the come-off preventing portions 12 and 13 are restricted from coming off from the mounting holes 22 and 23. As a result, the impact absorber 10 can be mounted on an automobile. However, in the case that the impact absorber 10 according to this embodiment is mounted on the automobile, the mounting object 20 is required to be mounted beforehand on a component of the automobile. With this configuration, the impact absorber 10 according to this embodiment can be mounted easily on the automobile without using mounting means, such as small screws and screws.

Moreover, in the impact absorber 10 according to this embodiment, since the impact absorber 10 can be mounted on the mounting object 20 using the shaft portion 11 and the come-off preventing portions 12 and 13 provided on the rear wall 3A, the installation space for mounting the impact absorber 10 on the mounting object 20 can be reduced. For example, in the case that the mounting portions are provided on the surrounding walls 3B, 4, 3c and 5, except the rear wall 3A, as in the conventional technology, an extra space for the mounting portions is required, whereby the space for installation becomes large. On the other hand, in the impact absorber 10 according to this embodiment, since the mounting portions (the shaft portion 11 and the come-off preventing portions 12 and 13) are provided on the rear wall 3A and the impact absorber 10 is mounted on the mounting object 20 using the mounting portions 11, 12 and 13, the installation space can be reduced, and the limited installation space can be used effectively. Furthermore, in the impact absorber 10 according to this embodiment, since the impact absorber 10 is mounted on the mounting object 20 using the shaft portion 11 and the come-off preventing portions 12 and 13 provided on the rear wall 3A, a dented portion 40 can be formed by partially denting the first side wall 4 serving as the surrounding wall inward. As a result, the range of the surrounding wall is reduced; when mounted in the installation space, the impact absorber 10 can be prevented from interfering with other vehicle components. The position and shape of the dented portion 40 are not limited and the dented portion 40 can be formed as desired on the basis of the installation relationship between the installation space and other vehicle components.

As shown in FIG. 4, the shaft portion 11 according to this embodiment is formed into a hollow shape by blow molding so as to be high in rigidity. The hollow portion 8 formed inside the shaft portion 11 is integrated with the hollow portion 2 formed inside the main body 3, whereby air can flow between the hollow portion 2 of the main body 3 and the hollow portion 8 of the shaft portion 11.

Furthermore, the shaft hole 21 corresponding to the shaft portion 11 has the same size as that of the outer shape of the shaft portion 11 and allows the shaft portion 11 to rotate in the shaft hole 21. For example, in the case that the shaft portion 11 is formed into a truncated cone shape, the shaft hole 21 is formed into a circular shape.

Moreover, as shown in FIG. 5, the come-off preventing portions 12 and 13 according to this embodiment are formed into a hollow shape by blow molding so as to be high in rigidity. Although FIG. 5 shows a configuration example of one of the come-off preventing portions, that is, the come-off preventing portion 13, the other come-off preventing portion 12 is also configured so as to have a configuration almost similar to that shown in FIG. 5. Besides, the hollow portions 9 formed inside the come-off preventing portions 12 and 13 are integrated with the hollow portion 2 formed inside the main body 3, whereby air can flow between the hollow portion 2 of the main body 3 and the hollow portions 9 of the come-off preventing portions 12 and 13.

What's more, as shown in FIG. 6, the come-off preventing portions 12 and 13 are configured so as to have shaft portions 12a and 13a making contact with the rear wall 3A of the main body 3 and the restricting portions 12b and 13b protruding from the end portions of the shaft portions 12a and 13a; when the main body 3 is rotated and moved while the shaft portion 11 is used as a rotation shaft as shown in FIGS. 12 and 13, the main body 3 is positioned on one of the faces of the mounting object 20, the restricting portions 12b and 13b are positioned on the other face of the mounting object 20, and the shaft portions 12a and 13a are positioned at the mounting holes 22 and 23. With this configuration, when the main body 3 is rotated and moved while the shaft portion 11 is used as rotation shaft, the restricting portions 12b and 13b are partially overlapped with the mounting object 20, thereby capable of restricting the come-off preventing portions 12 and 13 from coming off from the mounting holes 22 and 23.

Additionally, in the come-off preventing portions 12 and 13 according to this embodiment, each of thin portions (burrs) 12c and 13c is formed between each of the restricting portions 12b and 13b and the main body 3; when the main body 3 is rotated and moved while the shaft portion 11 is used as a rotation shaft, the thin portions (burrs) 12c and 13c are deformed by the mounting object 20, whereby close contact is made between each of the restricting portions 12b and 13b and the front face of the mounting object 20 and between the rear face of the mounting object 20 and the main body 3 using the thin portions (burrs) 12c and 13c. As a result, the mounting object 20 can be secured in a state in which the restricting portions 12b and 13b are partially overlapped with the mounting object 20.

Furthermore, when the impact absorber 10 according to this embodiment is formed by blow molding, each of the thin portions (burrs) 12c and 13c is inevitably formed between each of the restricting portions 12b and 13b provided at the ends of the come-off preventing portions 12 and 13 and the main body 3; however, when the main body 3 is rotated and moved while the shaft portion 11 is used as rotation shaft, the thin portions (burrs) 12c and 13c can be deformed by the mounting object 20; hence, the thin portions (burrs) 12c and 13c are not required to be removed after the blow molding, whereby a post treatment process (a finishing process such as deburring) after the blow molding can be simplified.

In the impact absorber 10 according to this embodiment, the shaft portion 11 and the come-off preventing portions 12 and 13 described above are provided on the parting line PL. With this configuration, the strength of the parting line PL of the rear wall 3A can be improved. As a result, when the impact absorber 10 is subjected to impact, the parting line PL of the rear wall 3A is prevented from breaking, whereby the impact absorbing performance can be ensured.

Moreover, as shown in FIGS. 4 and 5, the rear wall 3A according to this embodiment has convex portions 30 protruding toward the mounting object (not shown). The convex portions 30 are preferably formed on both sides (on the side of the first side wall 4 and on the side of the second side wall 5) across the parting line PL (the positions in which the shaft portion 11 and the come-off preventing portions 12 and 13 are provided) formed on the rear wall 3A. With this configuration, in the case that the rear wall 3A is mounted on the mounting object, the convex portions 30 formed on both sides (on the side of the first side wall 4 and on the side of the second side wall 5) of the rear wall 3A, instead of the position of the parting line PL (the positions in which the shaft portion 11 and the come-off preventing portions 12 and 13 are provided), make contact with the mounting object and support the main body 3, whereby the impact absorber 10 is hardly tilted and the impact absorber 10 can be secured stably to the mounting object. Besides, even in the case that the front wall 3D receives impact, the convex portions 30 formed on both sides (on the side of the first side wall 4 and on the side of the second side wall 5) of the rear wall 3A opposed to the front wall 3D make contact with the mounting object, whereby the sideway tilting and rotation of the impact absorber 10 can be prevented.

What's more, as shown in FIGS. 4 and 5, the impact absorber 10 according to this embodiment has the thin portions 31 at the corner portions for connecting the front wall 3D to the side walls (the first side wall 4 and the second side wall 5). The thickness of the thin portions 31 is in the range of 30 to 70% of the average thickness of the wall portions of the impact absorber 10. The thin portions 31 can be formed by adjusting the curved shapes of the corner portions for connecting the front wall 3D to the side walls (the first side wall 4 and the second side wall 5). In other words, the corner portions can be made thin by decreasing the radius of curvature of the metal mold for molding the corner portions.

Additionally, as shown in FIG. 3, the impact absorber 10 according to this embodiment has the thin portions 31 at the groove-shaped ribs 6 and 7 formed on the first side wall 4 and the second side wall 5. In this case, the thin portions 31 can be formed by increasing the stretching amounts of the resin at the portions in which the groove-shaped ribs 6 and 7 are formed. In other words, the thin portions 31 can be formed by making the curved shapes of the metal mold for forming the groove-shaped ribs 6 and 7 sharp (by decreasing the radius of curvature).

The impact absorber 10 according to this embodiment has the corner portions for connecting the front wall 3D to the side walls (the first side wall 4 and the second side wall 5) as shown in FIGS. 4 and 5 and has the thin portions 31 at the groove-shaped ribs 6 and 7 that are formed on the side walls (the first side wall 4 and the second side wall 5) as shown in FIG. 3, whereby in the case that the impact absorber 10 receives impact, the thin portions 31 preferentially buckle. As a result, when subjected to impact, the impact absorber 10 starts buckling without repulsing the impact, thereby being capable of effectively absorbing the impact. Furthermore, even in the case that the position (hitting position) of the load point subjected to impact at the front wall 3D deviates from the ideal position or the entering angle of the impact entering the front wall 3D deviates from the ideal entering angle, the thin portions 31 effectively receive the impact, whereby the sideway tilting and rotation of the impact absorber 10 can be prevented.

The average thickness of the wall portions constituting the impact absorber 10 according to this embodiment is preferably in the range of 0.7 to 5.0 mm, and the thickness of the above-mentioned thin portions 31 is preferably in the range of 30 to 70% of the average thickness of the wall portions. With this configuration, the impact absorber can effectively absorb impact.

The average thickness can be calculated as described below.

For example, the cross-sectional thicknesses of the portions (six portions in total) intersecting the perpendicular bisector of the linear lines connecting two metal mold splitting points at three positions (however, positions in which the groove-shaped ribs 6 and 7 are not formed and positions other than the corner portions for connecting the front wall 3D and the side walls (the first side wall 4 and the second side wall 5)) of the upper end side (on the side of the upper wall 3B), the center and the lower end side (on the side of the lower wall 3C) of the side walls (the first side wall 4 and the second side wall 5) shown in FIG. 3 are measured with a caliper, and the average value of the six measurement values is calculated as the average thickness. As a result, the average thickness of the wall portions constituting the impact absorber 10 can be calculated.

Figure 14:
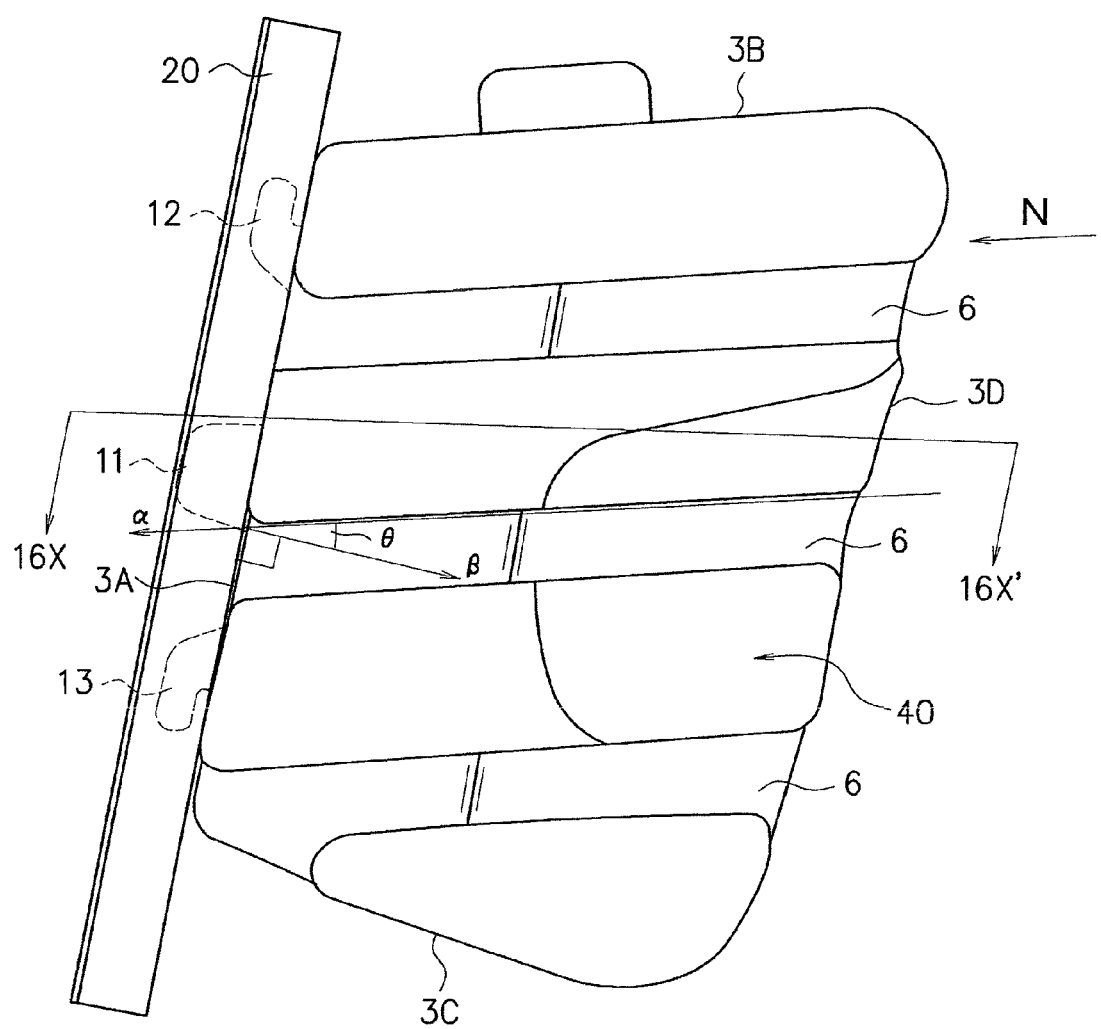
FIG. 14 is a view showing a configuration example of the impact absorber 10 mounted on the mounting object 20 on the side of the first side wall 4.
Figure 15:
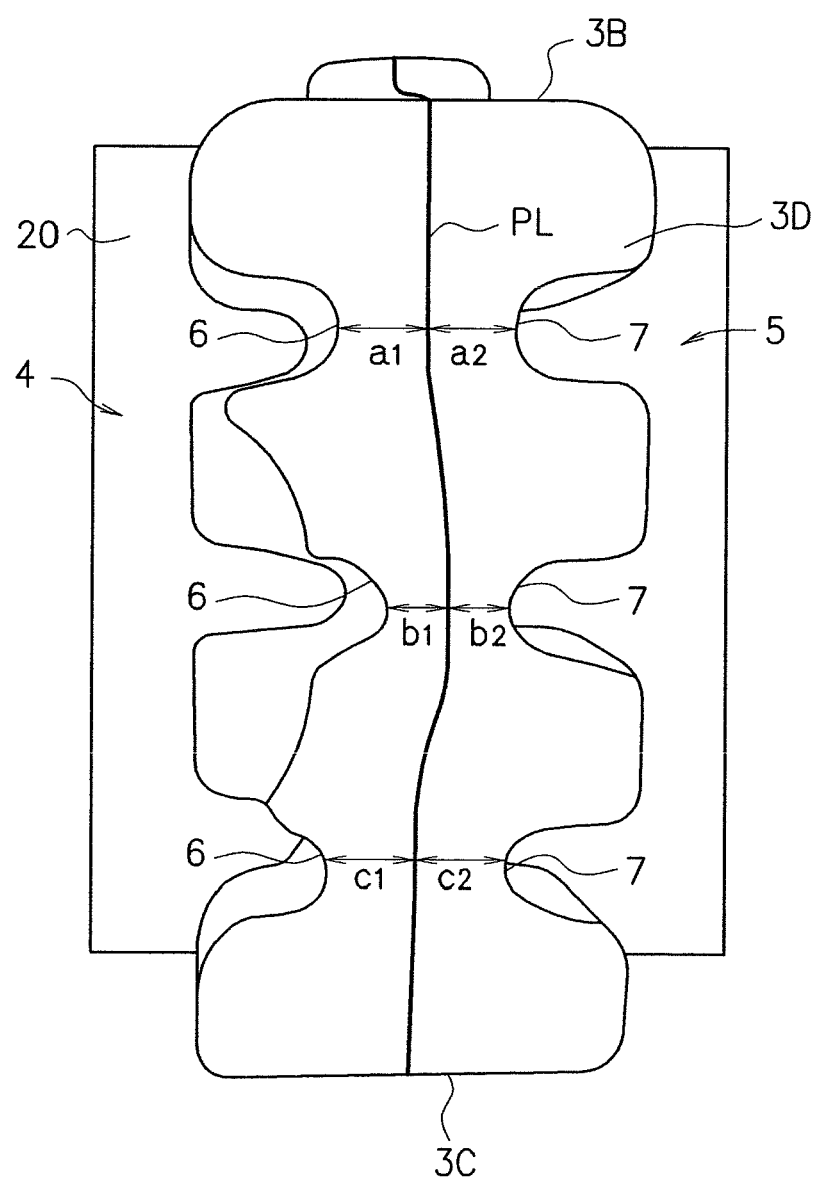
FIG. 15 is a view showing a configuration example of the impact absorber 10 mounted on the mounting object 20 on the side of the front wall 3D.
Figure 16:
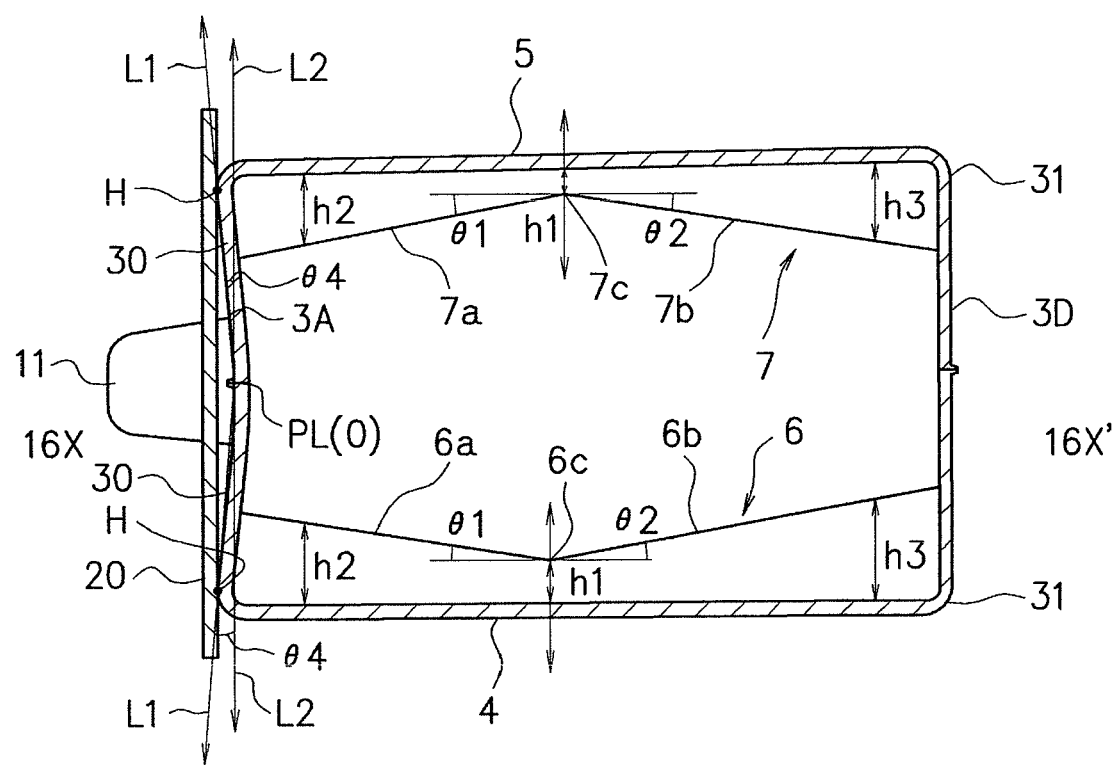
FIG. 16 is a view showing a cross-sectional configuration example, taken on line 16X-16X' shown in FIG. 14.

When the impact absorber 10 according to this embodiment is mounted on the mounting object 20, the shaft portion 11 is inserted into the shaft hole 21 and the come-off preventing portions 12 and 13 are inserted into the mounting holes 22 and 23 as shown in FIG. 12. Next, while the shaft portion 11 is used as a rotation shaft, the main body 3 is rotated by a predetermined angle (for example, 30°) and moved with respect to the mounting object 20, and the restricting portions 12b and 13b provided at the ends of the come-off preventing portions 12 and 13 are partially overlapped with the mounting object 20 as shown in FIG. 13. As a result, the shaft portion 11 and the come-off preventing portions 12 and 13 are restricted from coming off from the shaft hole 21 and the mounting holes 22 and 23, and the impact absorber 10 can be mounted on the mounting object 20 as shown in FIGS. 14 to 16. FIGS. 14 to 16 show states in which the impact absorber 10 is mounted on the mounting object 20; FIG. 14 shows a state as viewed from the side of the first side wall 4 serving as the surrounding wall of the impact absorber 10; FIG. 15 shows a state as viewed from the side of the front wall 3D; and FIG. 16 is a view showing a cross-sectional configuration example, taken on line 16X-16X' shown in FIG. 14.

As shown in FIG. 14, in the impact absorber 10 according to this embodiment, the groove-shaped ribs 6 extending from the front wall 3D toward the rear wall 3A are formed on the first side wall 4, and the predetermined angle θ is formed between the extension direction α of the groove-shaped rib 6 and the perpendicular direction β perpendicular to the surface of the rear wall 3A. Hence, the groove-shaped rib 6 extends in a direction inclined with respect to the perpendicular direction β perpendicular to the surface of the rear wall 3A. Consequently, as shown in FIG. 14, when the rear wall 3A is mounted on the mounting object 20, the extension direction α of the groove-shaped rib 6 can be the same as the impact direction N. The impact direction N is, for example, the direction of N shown in FIG. 14. As a result, in the case that the front wall 3D receives impact, while the rigidity against the impact is raised, the impact can be absorbed effectively at the groove-shaped rib 6. Although FIG. 14 shows the extension direction α of the groove-shaped rib 6 on the side of the first side wall 4, the extension direction α of the groove-shaped rib 7 on the side of the second side wall 5 is similar to that of the groove-shaped rib 6 on the side of the first side wall 4. FIG. 14 shows a state as viewed from the direction orthogonal to the first side wall 4, and the extension direction α of the groove-shaped rib 6 is inclined with respect to the perpendicular direction β perpendicular to the rear wall 3A.

Furthermore, as shown in FIG. 15, in the front wall 3D of the impact absorber 10 according to this embodiment, the parting line PL extends in connection with the upper end (on the side of the upper wall 3B) and the lower end (on the side of the lower wall 3C), thereby enhancing the rigidity of the front wall 3D. Hence, in the case that the front wall 3D receives impact, the front wall 3D can be made hardly broken. Moreover, in the front wall 3D, the groove-shaped ribs 6 and 7 are provided so that the distances from the bottom portions of the groove-shaped ribs 6 and 7 to the parting line PL are equal (a1=a2, b1=b2, C1=c2). Hence, even in the case that the position (hitting position) of the load point subjected to impact at the front wall 3D deviates from the ideal position or the entering angle of the impact entering the front wall 3D deviates from the ideal entering angle, the desired load can be maintained stably, and the desired impact absorption amount can be secured.

Furthermore, as shown in FIG. 2, in the impact absorber 10 according to this embodiment, the shaft portion 11 and the come-off preventing portions 12 and 13 are integrated with the rear wall 3A so as to be arranged on a straight line. Hence, as shown in FIG. 13, the positions at which the impact absorber 10 is mounted on the mounting object 20 can be arranged on the straight line.

Moreover, as shown in FIG. 16, the rear wall 3A of the impact absorber 10 according to this embodiment has the convex portions 30 protruding toward the mounting object 20, and the convex portions 30 are formed on both sides (on the side of the first side wall 4 and on the side of the second side wall 5) across the parting line PL (the positions in which the shaft portion 11 and the come-off preventing portions 12 and 13 are provided) formed on the rear wall 3A. With this configuration, in the case that the rear wall 3A is mounted on the mounting object 20, the convex portions 30 formed on both sides (on the side of the first side wall 4 and on the side of the second side wall 5) of the rear wall 3A make contact with the mounting object 20 and support the main body 3, whereby the impact absorber 10 is hardly tilted and the impact absorber 10 can be secured stably to the mounting object 20. Besides, even in the case that the front wall 3D receives impact, the convex portions 30 formed on both sides (on the side of the first side wall 4 and on the side of the second side wall 5) of the rear wall 3A opposed to the front wall 3D make contact with the mounting object 20, whereby the sideway tilting and rotation of the impact absorber 10 can be prevented.

As shown in FIG. 16, the convex portions 30 formed on both sides of the rear wall 3A according to this embodiment are configured so that the protruding amounts thereof increase continuously in directions away from the parting line PL (the positions in which the shaft portion 11 and the come-off preventing portions 12 and 13 are provided) toward both sides (on the side of the first side wall 4 and the second side wall 5). However, the protruding amounts can be configured so as to increase partially. The protruding amount is preferably set so that the angle θ4 formed by the line L1 for connecting the position PL(0) in which the parting line PL is formed on the rear wall 3A to the vertex H in which the convex portion 30 is formed and the demolding direction L2 of the split molds for molding the impact absorber 10 is in the range of 0° to 4°. In the case that the angle θ4 is 0°, the protruding amount becomes 0. In the case that the protruding amounts of both sides (on the side of the first side wall 4 and on the side of the second side wall 5) across the parting line PL are all 0, the convex portions 30 formed on both sides of the rear wall 3A become flat, and the surfaces of the rear wall 3A on both sides across the parting line PL are positioned on the same plane. Also in this case, both sides (on the side of the first side wall 4 and on the side of the second side wall 5) of the rear wall 3A across the parting line PL make contact with the mounting object 20, whereby the sideway tilting and rotation of the impact absorber 10 can be prevented.

The convex portions 30 to be formed on the rear wall 3A according to this embodiment can be formed, for example, as in the configuration example shown in FIG. 17(a). FIG. 17(a) shows a configuration example on the side of the rear wall 3A, and shows a configuration example in which the convex portions 30 are formed at partial regions of the rear wall 3A. The belt-like convex portions 30 on the line 17A-17A' and the belt-like convex portions 30 on the line 17C-17C' shown in FIG. 17(a) can be configured so that the protruding amounts thereof increase continuously in directions away from the parting line PL toward both sides (on the side of the first side wall 4 and the second side wall 5). Furthermore, the protruding amounts can be set to 0 in the regions from the parting line PL to both sides (on the side of the first side wall 4 and the second side wall 5). Moreover, the protruding amounts can be configured so as to change discontinuously between the parting line PL to both sides (on the side of the first side wall 4 and the second side wall 5). However, in the regions other than the regions of the convex portions 30, the protruding amounts decrease in directions away from the parting line PL to both sides (on the side of the first side wall 4 and the second side wall 5) as in the conventional technology; hence, even if the protruding amounts of the convex portions 30 are 0, the state in which the convex portions 30 on both sides across the parting line PL protrude can be configured eventually.

The rectangular convex portions 30 on line 17B-17B' shown in FIG. 17(a) are formed in partial regions from the parting line PL to both sides (on the side of the first side wall 4 and the second side wall 5); the convex portions 30 formed in the partial regions can be configured so that the protruding amounts thereof increase continuously in directions from the parting line PL toward both sides (on the side of the first side wall 4 and the second side wall 5) or configured so that the protruding amounts are 0 (flat shape) in the regions from the parting line PL to both sides. The cross-sectional shape of the rear wall 3A on line 17B-17B' shown in FIG. 17(a) can be configured by forming the convex portions 30 each having an arbitrary protruding amount in the partial regions of the rear wall 3A. The convex portions 30 shown in FIG. 17(b) shows a configuration example in the case that the protruding amounts increase continuously from the parting line PL toward both sides (on the side of the first side wall 4 and the second side wall 5).

Although the convex portions 30 shown in FIG. 17(a) are formed in the partial regions of the rear wall 3A, the convex portions can be formed in all the regions of the rear wall 3A. In this case, the convex portions are configured so that the protruding amounts increase continuously in directions away from the parting line PL to both sides (on the side of the first side wall 4 and the second side wall 5) or configured so that the protruding amounts are 0 in the regions from the parting line PL to both sides (on the side of the first side wall 4 and the second side wall 5).

In the case that the rear wall 3A having the convex portions 30 for preventing the above-mentioned sideway tilting and rotation is formed, split molds 200 having such cavity faces 202 as shown in FIG. 18 are used. In the split molds 200 shown in FIG. 18, the cavity faces 202 for forming the rear wall 3A having the above-mentioned convex portions 30 have concave portions 202A2 being dented in the orthogonal directions Y orthogonal to the demolding directions X of the split molds 200. With this configuration, the rear wall 3A having the convex portions 30 shown in FIG. 17 can be formed. The concave portions 202A2 are formed so that the dented amounts thereof in the orthogonal directions orthogonal to the demolding directions X of the split molds 200 increase in directions away from the cutting portion 202A1 for forming the parting line PL; hence, even if the cavity faces 202 are configured so as to have the concave portions 202A2, the impact absorber 10, that is, a molded product, can be easily removed from the split molds 200.

In addition, as shown in FIG. 16, the groove-shaped ribs 6 and 7 according to this embodiment are bent so as to become convex in directions away from the opposed side walls (the first side wall 4 and the second side wall 5); hence, even in the case that the entering angle of the impact entering the front wall 3D is different from the ideal entering angle, the impact can be absorbed. The groove-shaped ribs 6 and 7 shown in FIG. 16 are formed into a curved shape so as to become convex in directions away from the first side wall 4 and the second side wall 5 opposed to each other, and the bent angle θ3 of the groove-shaped ribs 6 and 7 is preferably in the range of 1 to 10°. In the case that the bent angle θ3 of the groove-shaped ribs 6 and 7 is less than 1°, the impact absorber 10 is liable to be tilted in the case that the entering angle of the impact entering the front wall 3D is different from the ideal entering angle; furthermore, in the case that the angle is more than 10°, the rigidity becomes low. For this reason, the bent angle θ3 of the groove-shaped ribs 6 and 7 is preferably in the range of 1 to 10°. In the groove-shaped ribs 6 and 7 shown in FIG. 16, the first side wall 4 and the second side wall 5 constituting the bottom portions of the groove-shaped ribs 6 and 7 are shown.

The bent angle θ3 of the groove-shaped ribs 6 and 7 is an angle in which the groove-shaped ribs 6 and 7 themselves are bent; for example, the bent angle θ3 of the groove-shaped rib 6 provided on the side of the first side wall 4 is the addition (θ3=θ1+θ2) of the angles (θ1, θ2) formed by the part of the first side wall 4 constituting the bottom portion of the groove-shaped rib 6 and the part of the first side wall 4 having no groove-shaped rib 6 and constituting a flat face.

The groove-shaped rib 6 has a first groove-shaped rib 6a and a second groove-shaped rib 6b, and the connection portion 6c for connecting the first groove-shaped rib 6a and the second groove-shaped rib 6b constitutes a portion being bent so as to become convex in directions away from the second side wall 5. The bent angle θ3 of the groove-shaped rib 6 consists of the angle θ1 formed by the part of the first side wall 4 constituting the bottom portion of the first groove-shaped rib 6a and the part of the first side wall 4 having no groove-shaped rib 6 and constituting the flat face and the angle θ2 formed by the part of the first side wall 4 constituting the bottom portion of the second groove-shaped rib 6b and the part of the first side wall 4 having no groove-shaped rib 6 and constituting the flat face (θ3=θ1+θ2).

Furthermore, as in the bent angle θ3 of the above-mentioned groove-shaped rib 6, the bent angle θ3 of the groove-shaped rib 7 provided on the side of the second side wall 5 is also the addition (θ3=θ1+θ2) of the angles (θ1, θ2) formed by the part of the second side wall 5 constituting the bottom portion of the groove-shaped rib 7 and the part of the second side wall 5 having no groove-shaped rib 7 and constituting the flat face.

The groove-shaped rib 7 has a first groove-shaped rib 7a and a second groove-shaped rib 7b, and the connection portion 7c for connecting the first groove-shaped rib 7a and the second groove-shaped rib 7b constitutes a portion being bent so as to become convex in directions away from the first side wall 4. The bent angle θ3 of the groove-shaped rib 7 consists of the angle θ1 formed by the part of the second side wall 5 constituting the bottom portion of the first groove-shaped rib 7a and the part of the second side wall 5 having no groove-shaped rib 7 and constituting the flat face and the angle θ2 formed by the part of the second side wall 5 constituting the bottom portion of the second groove-shaped rib 7b and the part of the second side wall 5 having no groove-shaped rib 7 and constituting the flat face (θ3=θ1+θ2).

The first groove-shaped rib 6a and the second groove-shaped rib 6b constituting the groove-shaped rib 6 according to this embodiment are disposed plane-symmetrically with respect to the face configured by the connection portion 6c. Similarly, the first groove-shaped rib 7a and the second groove-shaped rib 7b constituting the groove-shaped rib 7 are disposed plane-symmetrically with respect to the face configured by the connection portion 7c. Hence, θ1 and θ2 shown in FIG. 16 have the same angle (θ1=θ2).

Moreover, the groove-shaped rib 6 and the groove-shaped rib 7 are disposed plane-symmetrically with respect to the plane (the plane in parallel with the first side wall 4 and the second side wall 5) configured by the region at the position of the intermediate point between the bottom portion of the groove-shaped rib 6 and the bottom portion of the groove-shaped rib 7. Hence, in the case that the front wall 3D receives impact, the groove-shaped ribs 6 and 7 buckle equally, whereby the impact can be absorbed uniformly.

Figure 19:
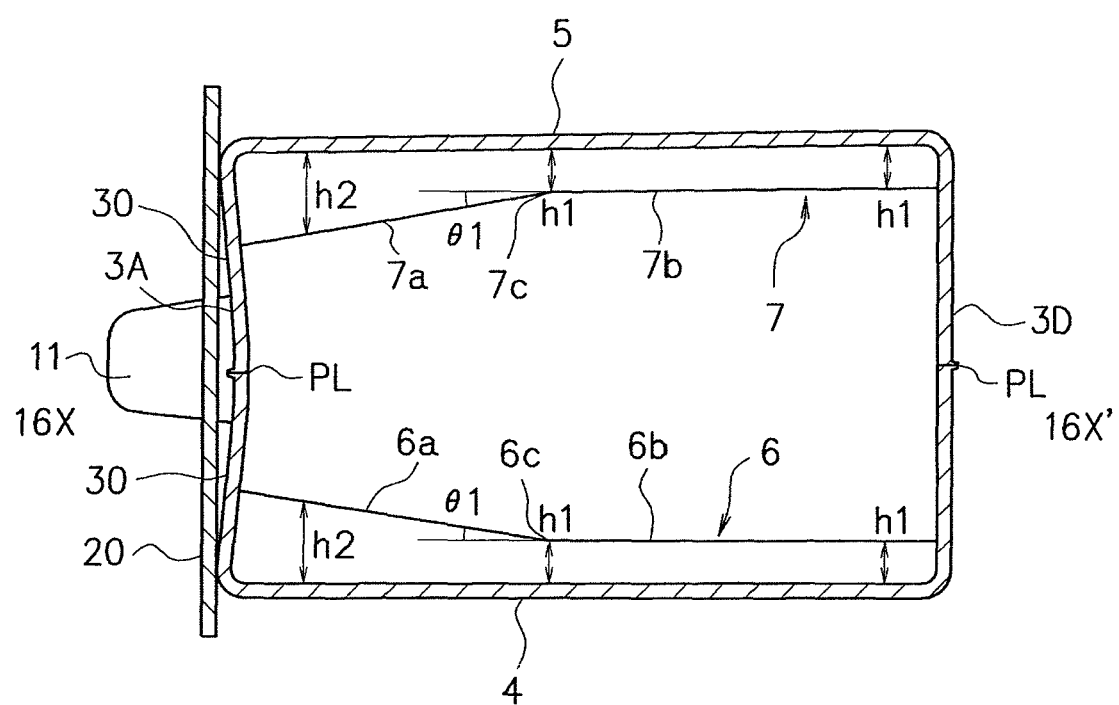
FIG. 19 is a view showing a configuration example of the bent portions of groove-shaped ribs.

The groove-shaped ribs 6 and 7 shown in FIG. 16 are bent so as to become convex in directions (outward directions) away from the first side wall 4 and the second side wall 5 opposed to each other; however, the groove-shaped ribs can also be bent so as to become convex in directions (inward directions) approaching the first side wall 4 and the second side wall 5 opposed to each other. Furthermore, the groove-shaped ribs 6 and 7 shown in FIG. 16 are formed so that the depth h2 of the groove-shaped ribs 6 and 7 on the side of the rear wall 3A and the depth h3 of the groove-shaped ribs 6 and 7 on the side of the front wall 3D are deeper than the depth h1 of the groove-shaped ribs 6 and 7 near the center thereof (h1<h2 and h1<h3). However, as shown in FIG. 19, the depth of the groove-shaped ribs 6 and 7 in the range from the front wall 3D to the region near the center can be set to the same depth h1, and the depth h2 of the groove-shaped ribs 6 and 7 on the rear wall 3A can be made deeper (h1<h2). The bent angle θ3 of the groove-shaped ribs 6 and 7 shown in FIG. 19 is the angle θ1 formed by the part of each of the side walls 4 and 5 constituting the bottom portion of each of the first groove-shaped ribs 6a and 7a and the part of each of the side walls 4 and 5 having no groove-shaped ribs 6 and 7 and constituting the flat face.

In the case that the groove-shaped ribs 6 and 7 provided on the first side wall 4 and the second side wall 5 serving as the surrounding walls for connecting the front wall 3D to the rear wall 3A are bent, the bent portions can effectively absorb impact. Although the groove-shaped ribs 6 and 7 shown in FIGS. 16 and 19 are configuration examples in which the ribs are bent at the regions near the centers of the rear wall 3A and the front wall 3D, the positions of the bent portions are not limited to the regions near the centers, but a configuration example is possible in which the groove-shaped ribs are bent at arbitrary positions.

In addition, in the impact absorber 10 according to this embodiment, the shaft portion 11 is provided at the center of the rear wall 3A, and the come-off preventing portions 12 and 13 are provided on both sides of the shaft portion 11. In the case that the shaft portion 11 is provided at the center of the rear wall 3A, the rotation radius of the main body 3 can be made small, whereby the space required for the installation work of the impact absorber 10 can be made small. For example, in the case that the shaft portion 11 is provided near one of the end portions of the rear wall 3A and that at least one of the come-off preventing portions, that is, the come-off preventing portion 12, is provided near the other end portion of the rear wall 3A, the main body 3 is rotated while the shaft portion 11 is used as a rotation shaft, and the come-off preventing portion 12 is fitted into the mounting hole 22 corresponding to the come-off preventing portion 12, whereby the rotation radius of the main body 3 becomes large. On the other hand, in the case that the shaft portion 11 is provided near the center of the rear wall 3A and the come-off preventing portions 12 and 13 are provided near both ends of the rear wall 3A, the main body 3 is rotated while the shaft portion 11 is used as a rotation shaft, and the come-off preventing portions 12 and 13 are fitted into the installation holes 22 and 23 corresponding to the come-off preventing portions 12 and 13, whereby the rotation radius of the main body 3 can be made small. Hence, in the case that the shaft portion 11 is provided at the center of the rear wall 3A and the come-off preventing portions 12 and 13 are provided on both sides of the shaft portion 11, the rotation radius of the main body 3 can be made small. Furthermore, in the case that the come-off preventing portions 12 and 13 are provided on both sides of the shaft portion 11, the rotation of the main body 3 can be easily restricted.

Moreover, as shown in FIGS. 12 and 13, the impact absorber 10 according to this embodiment has the two come-off preventing portions 12 and 13, and the distance r1 between the first come-off preventing portion 12 and the shaft portion 11 is made different from the distance r2 between the second come-off preventing portion 13 and the shaft portion 11. The installation holes 22 and 23 provided in the mounting object 20 are aligned with the come-off preventing portions 12 and 13. With this configuration, incorrect insertion of the come-off preventing portions 12 and 13 can be prevented. In this embodiment, since the two come-off preventing portions 12 and 13 are configured so as to have the same shape, the distances r1 and r2 to the shaft portion 11 are made different from each other. However, the two come-off preventing portions 12 and 13 can be configured so as to have different shapes to prevent incorrect insertion of the come-off preventing portions 12 and 13.

Figure 20:
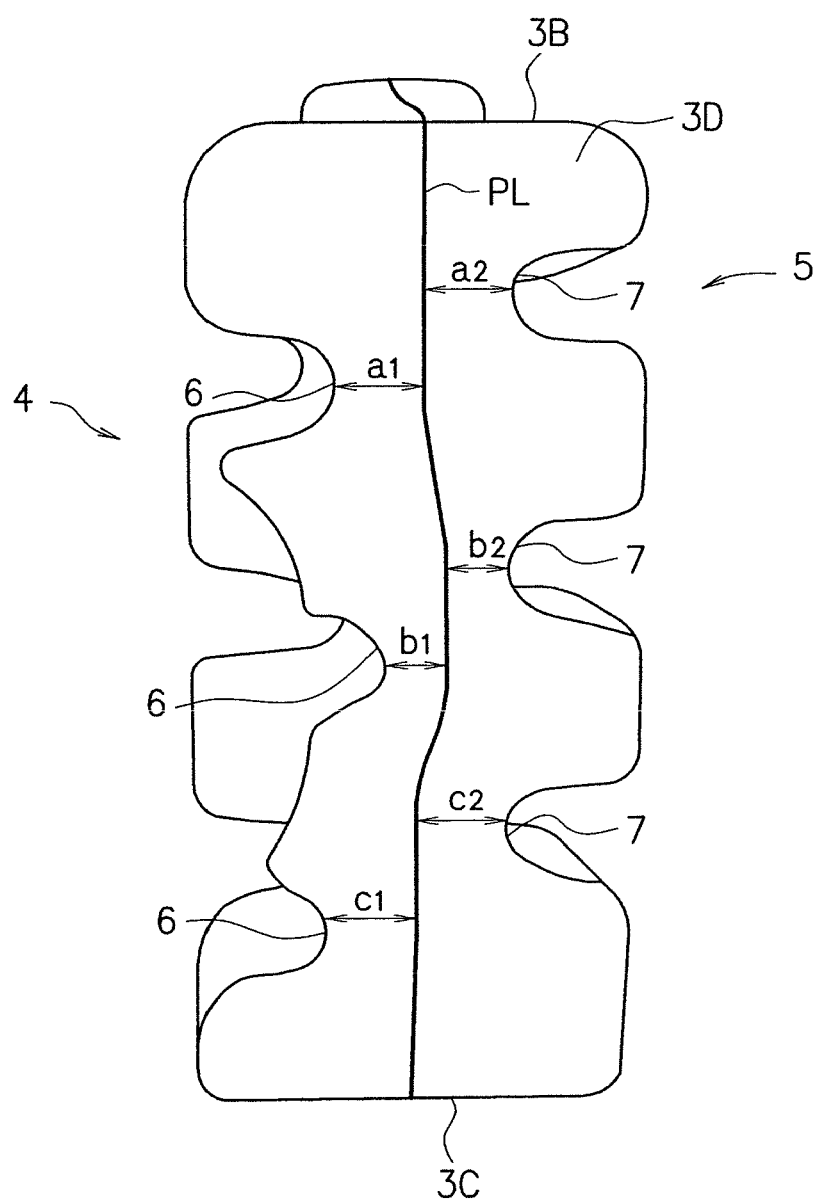
FIG. 20 is a view showing another configuration example of the front wall 3D.

As shown in FIG. 11, the above-mentioned impact absorber 10 is configured so that the groove-shaped rib 6 provided on the side of the first side wall 4 and the groove-shaped rib 7 provided on the side of the second side wall 5 are opposed to each other at the same position. However, as shown in FIG. 20, the impact absorber can also be configured so that the groove-shaped rib 6 provided on the side of the first side wall 4 and the groove-shaped rib 7 provided on the side of the second side wall 5 are opposed to each other alternately. Also in this configuration, the groove-shaped ribs 6 and 7 are preferably provided so that the distances from the bottom portions of the groove-shaped ribs 6 and 7 to the parting line PL are equal (a1=a2, b1=b2, C1=c2). With this configuration, even in the case that the position (hitting position) subjected to impact at the front wall 3D deviates from the ideal position or the entering angle of the impact entering the front wall 3D is different from the ideal entering angle, the desired load can be maintained stably, whereby the desired impact absorption amount can be secured. The distances from the bottom portions of the groove-shaped ribs 6 and 7 to the parting line PL are values measured in a state in which the lines connecting the bottom portions of the groove-shaped ribs 6 and 7 to the parting line PL are orthogonal.

Furthermore, as shown in FIG. 2, the above-mentioned impact absorber 10 has the come-off preventing portions 12 and 13 on the rear wall 3A, and as shown in FIG. 12, the shaft portion 11 is inserted into the shaft hole 21 and the come-off preventing portions 12 and 13 are inserted into the mounting holes 22 and 23. Moreover, as shown in FIG. 13, the main body 3 is rotated and moved with respect to the mounting object 20 while the shaft portion 11 is used as a rotation shaft, and the restricting portions 12b and 13b of the come-off preventing portions 12 and 13 are partially overlapped with the mounting object 20, whereby the impact absorber 10 is mounted on the mounting object 20. However, at least one of the come-off preventing portions 12 and 13 may be used, and even in such a configuration having the shaft portion 11 and the one come-off preventing portion 12, the impact absorber 10 can be mounted on the mounting object 20.

What's more, in the above-mentioned impact absorber 10, the shaft portion 11 is inserted into the shaft hole 21 serving as a through hole. However, the shaft hole 21 is not required to be a through hole, but the shaft hole 21 having any shapes can be provided if the shaft portion 11 can rotate stably. Besides, without providing the shaft hole 21 in the mounting object 20, the shaft portion 11 can be rotated while the shaft portion 11 is made constant with the mounting object 20. Furthermore, without providing the shaft portion 11 on the rear wall 3A, only the two come-off preventing portions 12 and 13 are provided on the rear wall 3A, the two come-off preventing portions 12 and 13 are inserted into the mounting holes 22 and 23, and the come-off preventing portions 12 and 13 are moved in the regions of the mounting holes 22 and 23, whereby it is also possible that the main body 3 is rotated, the restricting portions 12b and 13b of the come-off preventing portions 12 and 13 are partially overlapped with the mounting object 20, and the impact absorber 10 is mounted on the mounting object 20.

Furthermore, in the above-mentioned impact absorber 10, the shaft portion 11 is provided on the side of the rear wall 3A, and the shaft hole 21 is provided on the side of the mounting object 20. However, it is also possible that the shaft hole 21 is provided on the side of the rear wall 3A and the shaft portion 11 is provided on the side of the mounting object 20.

Figure 21:
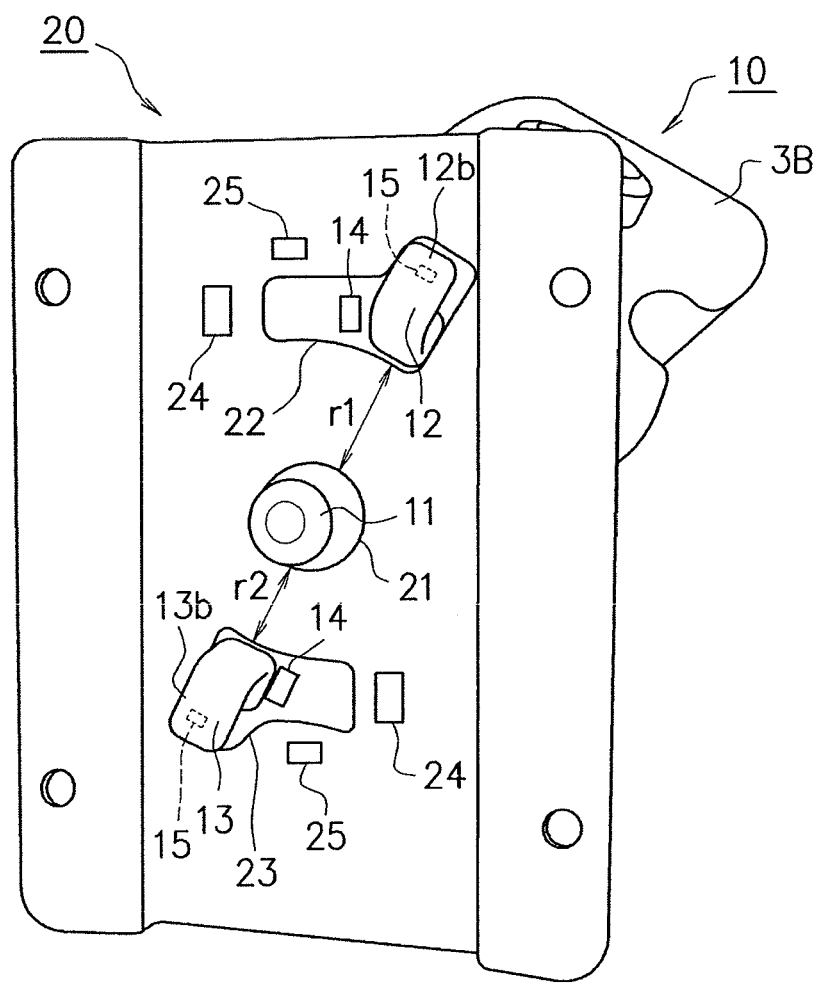
FIG. 21 is a first view showing a configuration example in which engagement portions 14 and 15 are provided.
Figure 22:
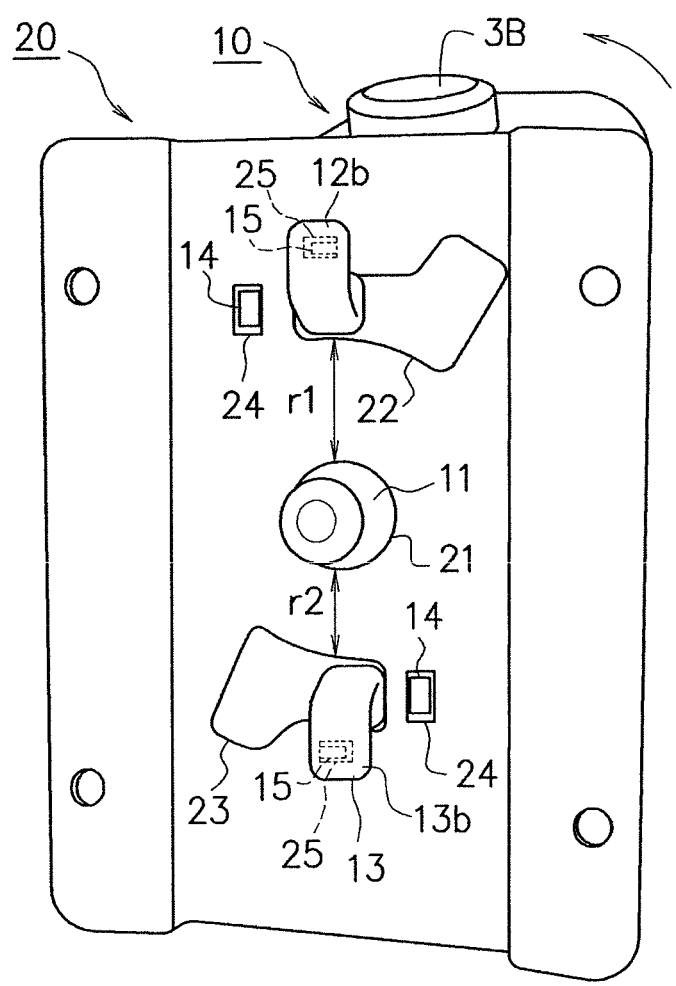
FIG. 22 is a second view showing a configuration example in which engagement portions 14 and 15 are provided.

Moreover, the impact absorber 10 according to this embodiment can also be configured so as to have at least one of engagement portions 14 and 15, the engagement portion 14 protruding from the rear wall 3A and the engagement portion 15 protruding from the come-off preventing portions 12 and 13 as shown in FIG. 21, wherein the engagement portions 14 and 15 are engaged with the engagement holes 24 and 25 provided in the mounting object 20 when the main body 3 is rotated as shown in FIG. 22, whereby the main body 3 is restricted from being rotated in the opposite direction. The engagement hole 24 is a hole corresponding to the engagement portion 14 protruding from the rear wall 3A, and the engagement hole 25 is a hole corresponding to the engagement portion 15 protruding from each of the come-off preventing portions 12 and 13.

The engagement portions 14 and 15 are formed into a hollow shape by blow molding so as to high in rigidity. Furthermore, the hollow portion formed inside the engagement portion 14 protruding from the rear wall 3A is integrated with the hollow portion 2 formed inside the main body 3, whereby air can enter between the hollow portion 2 of the main body 3 and the hollow portion of the engagement portion 14. Moreover, the hollow portion formed inside the engagement portion 15 protruding from each of the come-off preventing portions 12 and 13 is integrated with the hollow portion 9 formed inside each of the come-off preventing portions 12 and 13, whereby air can enter between the hollow portion 9 of each of the come-off preventing portions 12 and 13 and the hollow portion of the engagement portion 15.

As the shapes of the engagement portions 14 and 15 and the engagement holes 24 and 25, any configuration examples can be applied, provided that the engagement portions 14 and 15 can be inserted into the engagement holes 24 and 25, that the engagement portions 14 and 15 are engaged with the engagement holes 24 and 25, and that the rotation of the main body 3 in the opposite direction can be restricted. For example, the shapes can be a triangular shape or a circular arc shape. However, in consideration of restricting the rotation of the main body 3 in the opposite direction, the portions of the engagement portions 14 and 15, designed to make contact with the engagement holes 24 and 25, preferably have a shape making surface contact with the engagement holes 24 and 25.

Figure 23:
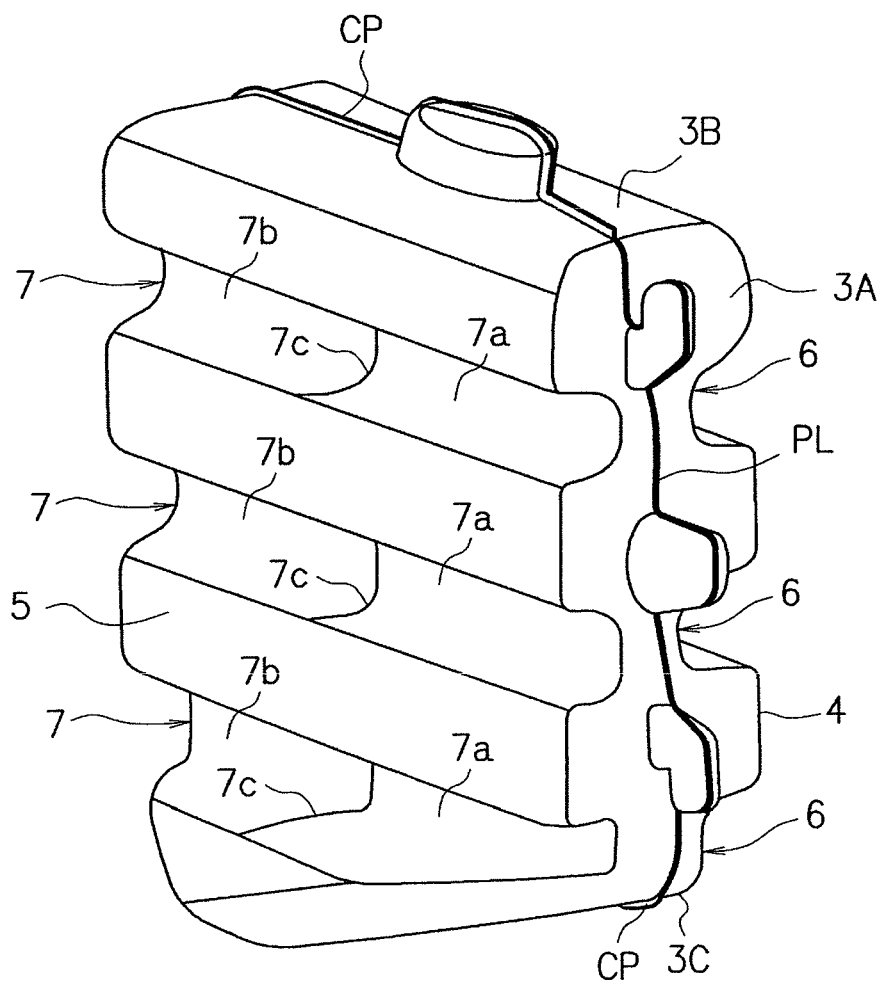
FIG. 23 is a perspective view showing the impact absorber 10 as viewed from the side of the rear wall 3A.
Figure 24:
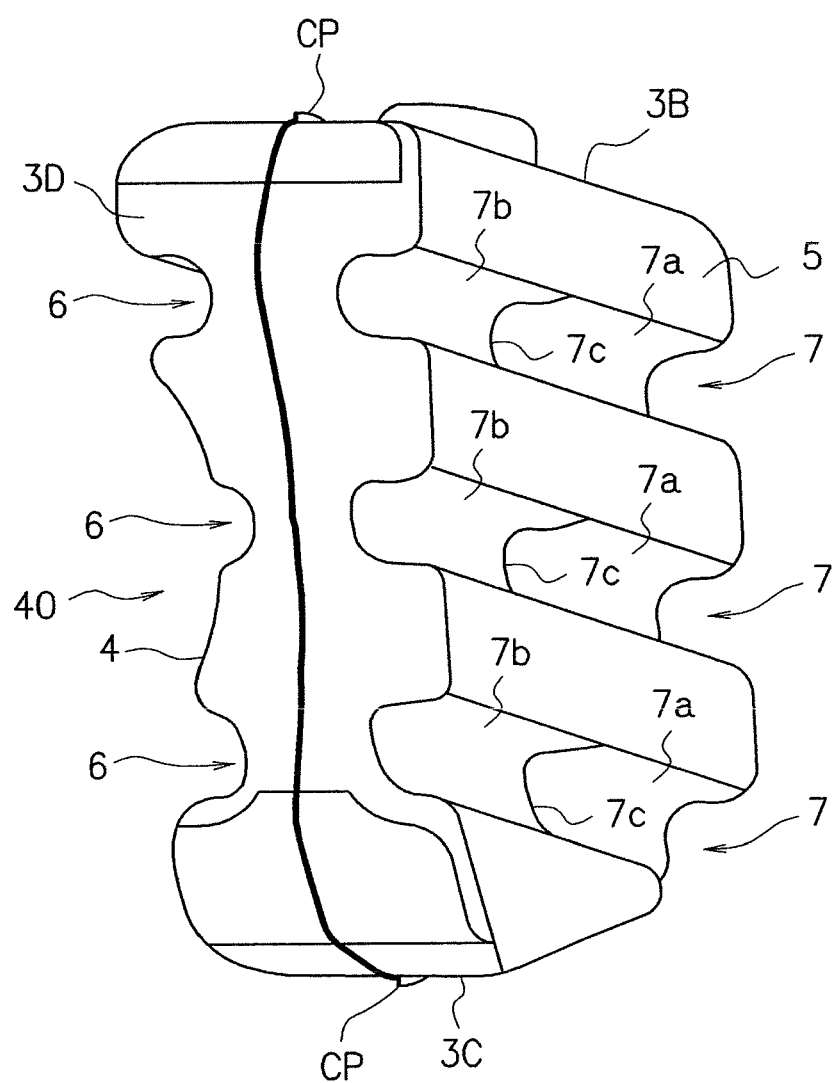
FIG. 24 is a perspective view showing the impact absorber 10 as viewed from the side of the front wall 3D.

In addition, in the impact absorber 10 according to this embodiment, as shown in FIGS. 23 and 24, compression portions CP are left at the portions of the parting line PL passing through the upper wall 3B and the lower wall 3C, thereby enhancing the welding strength of the upper wall 3B and the lower wall 3C. Furthermore, the portions of the parting line PL passing through the front wall 3D to be subjected to impact and the rear wall 3A to be mounted on the mounting object 20 are preferably made flat. With this configuration, breakage from the parting line PL can be prevented, and stable impact absorption is made possible. FIG. 23 is a perspective view showing the impact absorber 10 as viewed from the side of the rear wall 3A, and FIG. 24 is a perspective view showing the impact absorber 10 as viewed from the side of the front wall 3D.

Moreover, in the impact absorber 10 according to this embodiment, as shown in FIG. 24, a dented portion 40 can be formed by denting part of the first side wall 4 serving as a surrounding wall inward. As a result, when the region around the surrounding wall is lowered and the impact absorber 10 is mounted in the installation space, interference with other vehicle components can be prevented.

Figure 25:
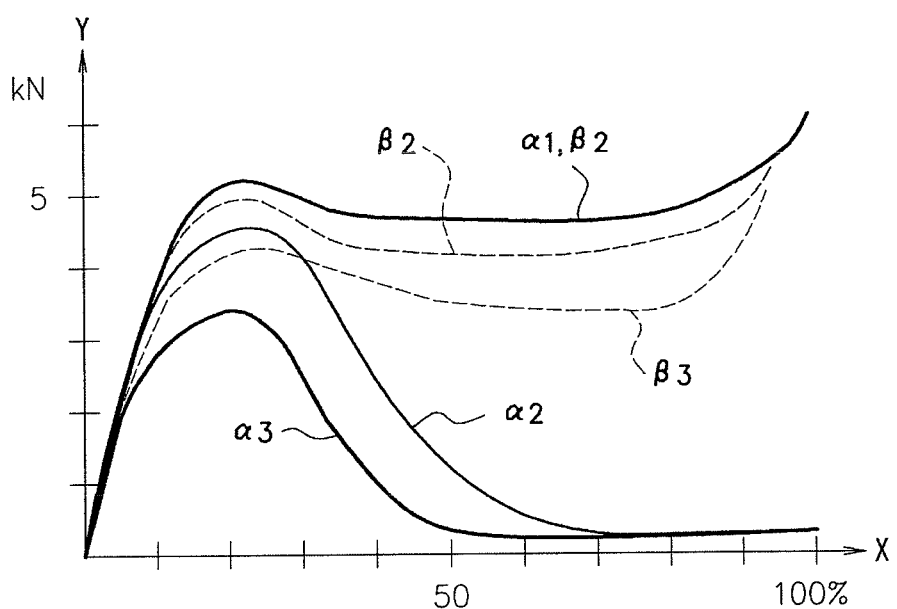
FIG. 25 is a view showing the measurement results of impact absorbing performance.
Figure 26:
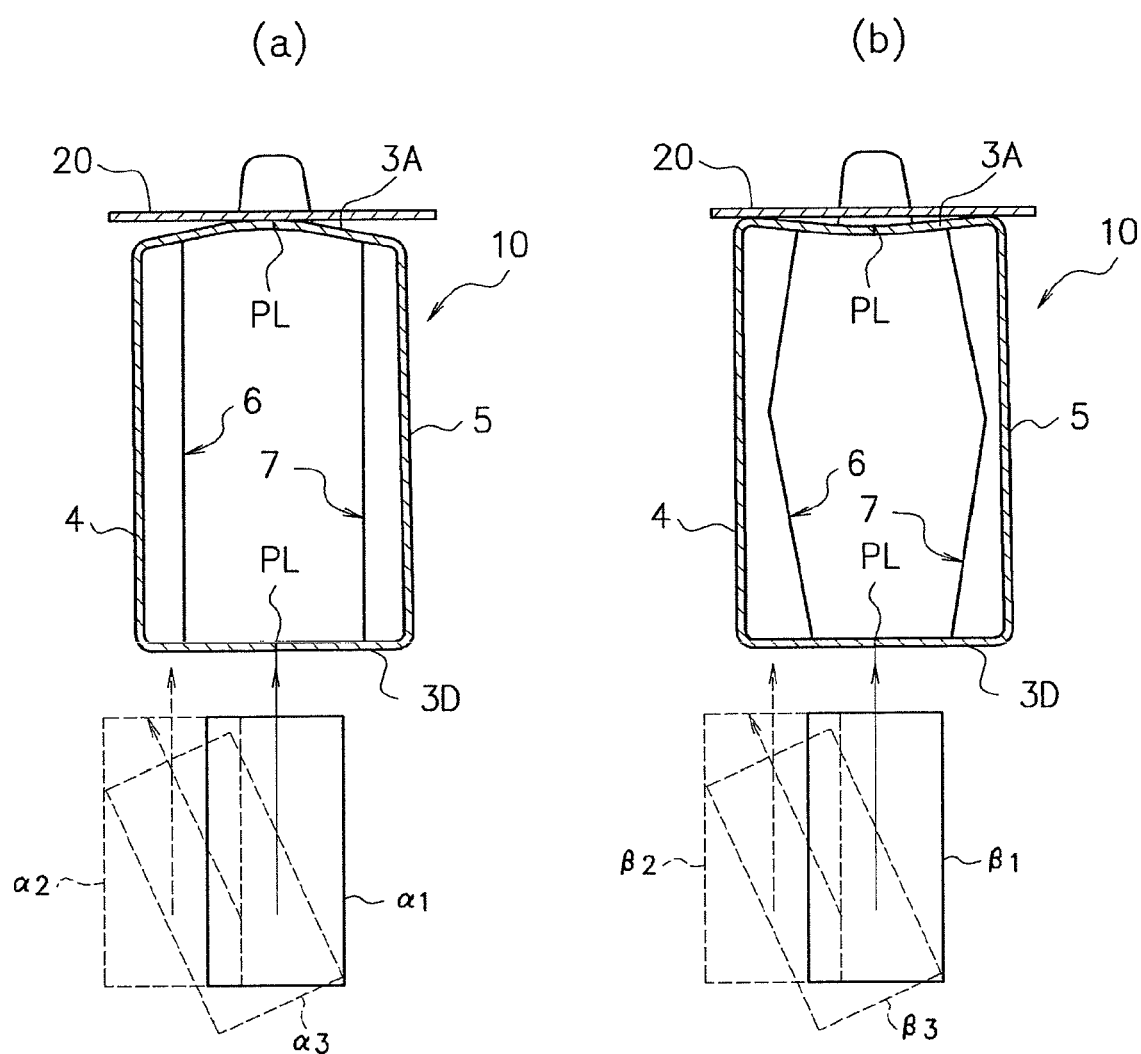
FIG. 26 is a view showing configuration examples of impact absorbers used for an impact absorbing performance measurement test.

FIG. 25 is a graph showing the test results obtained when the impact absorbers made by blow molding according to Example (b) and Comparison Example (a) shown in FIG. 26 are subjected to a test using a collision tester. FIG. 25 shows the test results in the case ($\alpha 1$, $\beta 1$) that impact is received from the ideal position, in the case ($\alpha 2$, $\beta 2$) that impact is received from a position deviating from the ideal position, and in the case ($\alpha 3$, $\beta 3$) that impact is received at an entry angle different from the ideal entering angle. In FIG. 25, the vertical axis Y indicates a load, and the horizontal axis X indicates the rate of change.

The dimensions of the impact absorber according to Comparison Example shown in FIG. 26($a$) are as follows: the front wall 3D measures 120 mm×50 mm, the upper wall 3B measures 80 mm×50 mm, the rear wall 3A measures 90 mm×50 mm, and the lower wall 3C measures 70 mm×50 mm. Hence, each of the first side wall 4 and the second side wall 5 measures 80 mm on the side of the upper wall 3B, 70 mm on the side of the lower wall 3C, 90 mm on the side of the front wall 3D, and 120 mm on the side of the front wall 3D. Furthermore, the average thickness of the wall portions of the impact absorber is set to 1.30 mm, and the thickness of the thin portions 31 formed at the corner portions for connecting the front wall 3D to the surrounding walls 4, 5, 3B and 3C is set to 0.96 mm. Moreover, the groove-shaped ribs 6 and 7 are formed into a linear shape. What's more, the rear wall 3A is configured so that the position of the parting line PL protrudes further than the positions of both side ends (on the side of the first side wall 4 and on the side of the second side wall 5) to the side of the mounting object 20.

The dimensions of the impact absorber according to Example shown in FIG. 26($b$) are made equal to the dimensions of Comparison Example, and the average thickness of the wall portions of the impact absorber is set to 1.48 mm, and the thickness of the thin portions 31 formed at the corner portions for connecting the front wall 3D to the surrounding walls 4, 5, 3B and 3C is set to 0.48 mm. Furthermore, the groove-shaped ribs 6 and 7 are formed into a bent shape. Moreover, the rear wall 3A is configured so that the positions of both side ends (on the side of the first side wall 4 and on the side of the second side wall 5) protrude further than the position of the parting line PL to the side of the mounting object 20.

In the impact absorber according to Example shown in FIG. 26($b$), the shape of the rear wall 3A, the shape of the groove-shaped ribs 6 and 7, and the thickness of the thin portions 31 are made different so that the impact absorbing performance obtained in the case that impact is received at the ideal position ($\beta 1$) is equal to that of the impact absorber according to Comparison Example shown in FIG. 26($a$).

As the material constituting the impact absorber, polypropylene "AD571" (having a bending elastic modulus of 105 MPa) made by Mitsui-Sumitomo Chemicals, Inc. was used.

The collision tester is a collision tester made by Hodogay-agiken Corporation, and a columnar impact element measuring 75 mm in diameter at its tip end and 160 mm in length was collided at a speed of 19 km/h.

As clearly indicated by the test results shown in FIG. 25, in the case that a target load was set to 5 KN in view of preventing damage to an occupant, it was found that, in the case of the impact absorber according to Comparison Example, the impact absorption amount became smaller in the case ($\alpha 2$) that impact was received from a position deviating from the ideal position and in the case ($\alpha 3$) that impact was received at an entering angle different from the ideal entering angle.

On the other hand, in the case of the impact absorber of Example, it was found that the impact absorption amount was unchanged in the case ($\beta 2$) that impact was received from a position deviating from the ideal position and in the case ($\beta 3$) that impact was received at an entering angle different from the ideal entering angle, and that a stable impact absorption amount was able to be secured. The impact absorption amount is indicated by the area of the portion enclosed with the lower portion of the curve and the horizontal axis (however, the range exceeding the target load is excluded).

Hence, in the case that, as in the impact absorber of Example shown in FIG. 26($b$), the thin portions 31 are formed at the corner portions for connecting the front wall 3D to the surrounding walls 4, 5, 3B and 3C, the groove-shaped ribs 6 and 7 are formed into bent shape, and the rear wall 3A is configured so that the positions of both side ends (on the side of the first side wall 4 and on the side of the second side wall 5) protrude further than the position of the parting line PL to the side of the mounting object 20, the stable impact absorption amount can be secured and desired impact absorbing performance can be delivered even in the case that impact was received from a position deviating from the ideal position or even in the case that impact was received at an entering angle different from the ideal entering angle.

<Actions and Effects of the Impact Absorber 10 According to this Embodiment>

As described above, the impact absorber 10 according to this embodiment is configured so as to have the front wall 3D for receiving impact, the rear wall 3A opposed to the front wall 3D, the surrounding walls (corresponding to the upper wall 3B, the first side wall 4, the lower wall 3C, and the second side wall 5) for connecting the circumferences of the front wall 3D and the rear wall 3A, and the parting line PL passing through the front wall 3D and the rear wall 3A, and as shown in FIG. 4, the thin portions 31 are formed at the corner portions for connecting the front wall 3D to the surrounding walls (the first side wall 4 and the second side wall 5). Furthermore, as shown in FIG. 2, the groove-shaped ribs 6 and 7 extending from the front wall 3D toward the rear wall 3A are formed on the surrounding walls (the first side wall 4 and the second side wall 5), and as shown in FIG. 3, the thin portions 31 are formed at the groove-shaped ribs 6 and 7.

Hence, even if the impact receiving portion of the impact absorber 10 deviates from the desired position, the thin portions 31 of the wall portions constituting the impact absorber 10 preferentially buckle. As a result, even if the impact receiving portion of the impact absorber 10 deviates from the desired position, the impact absorber 10 can effectively absorb the impact.

In the above-mentioned embodiment, the come-off preventing portions 12 and 13 of the impact absorber 10 are inserted into the mounting holes 22 and 23 provided in the mounting object 20. However, the configuration of the mounting object 20 can be formed beforehand so as to be used for an automobile component and the impact absorber 10 can be directly mounted on the automobile component (the mounting object). For example, it is possible that the mounting holes 22 and 23 are formed beforehand in the automobile component, and the come-off preventing portions 12 and 13 of the impact absorber 10 are directly mounted on the automobile component (the mounting object).

Second Embodiment

Next, a second embodiment will be described.

In the first embodiment, the impact absorber 10 suited for a knee bolster has been described.

In the second embodiment, an impact absorber 10 suited for a bumper absorber will be described.

<Configuration Example of the Impact Absorber 10>

Figure 27:
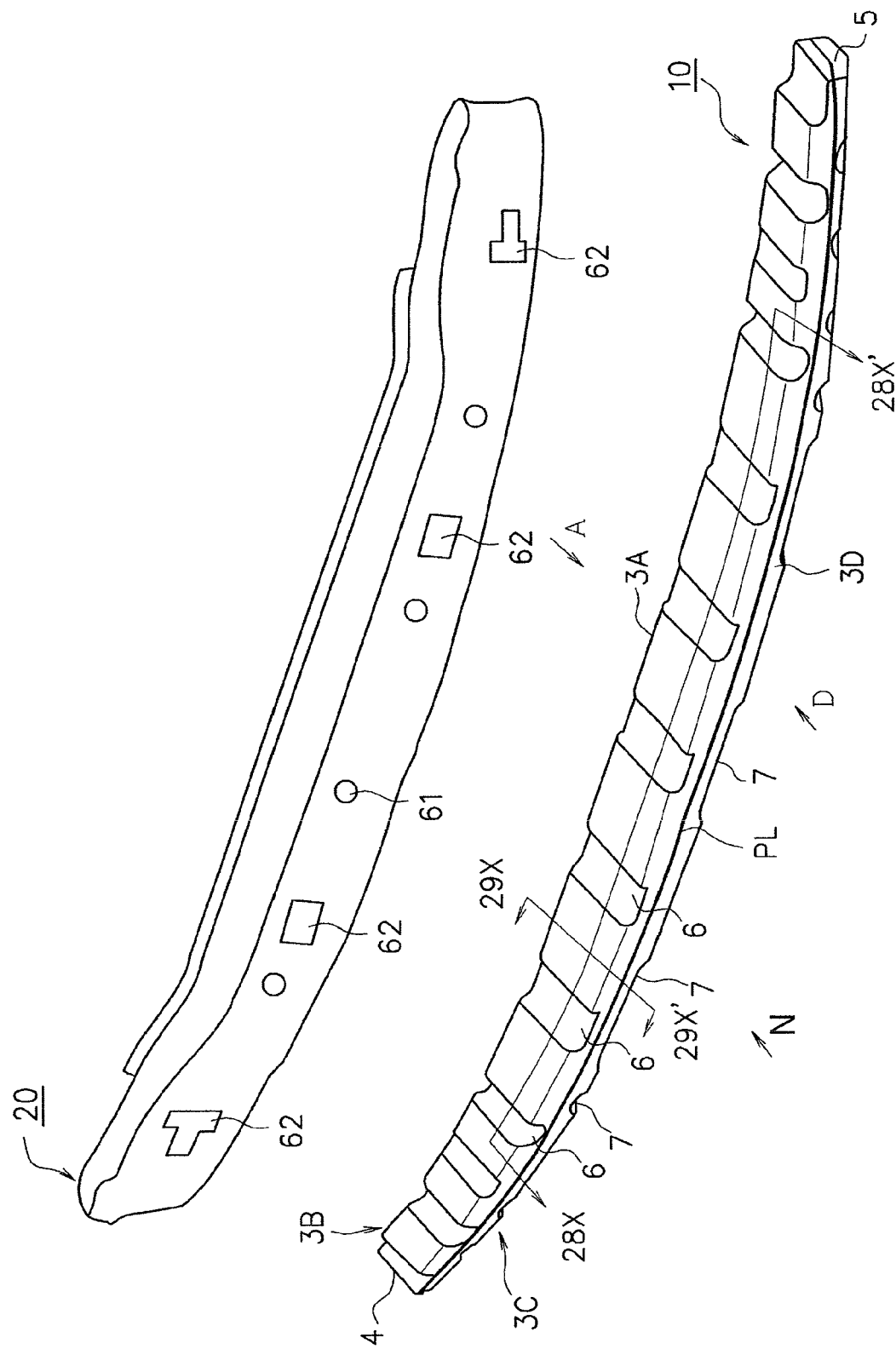
FIG. 27 is a view showing the entire configuration examples of an impact absorber 10 according to a second embodiment and a mounting object 20 on which the impact absorber 10 is mounted.
Figure 28:
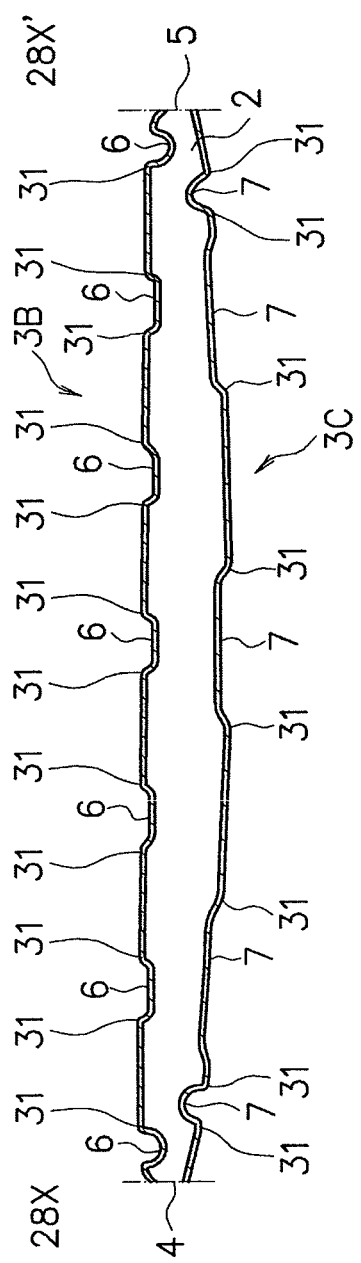
FIG. 28 is a cross-sectional configuration example of the impact absorber 10 shown in FIG. 27, taken on line 28X-28X'.
Figure 29:
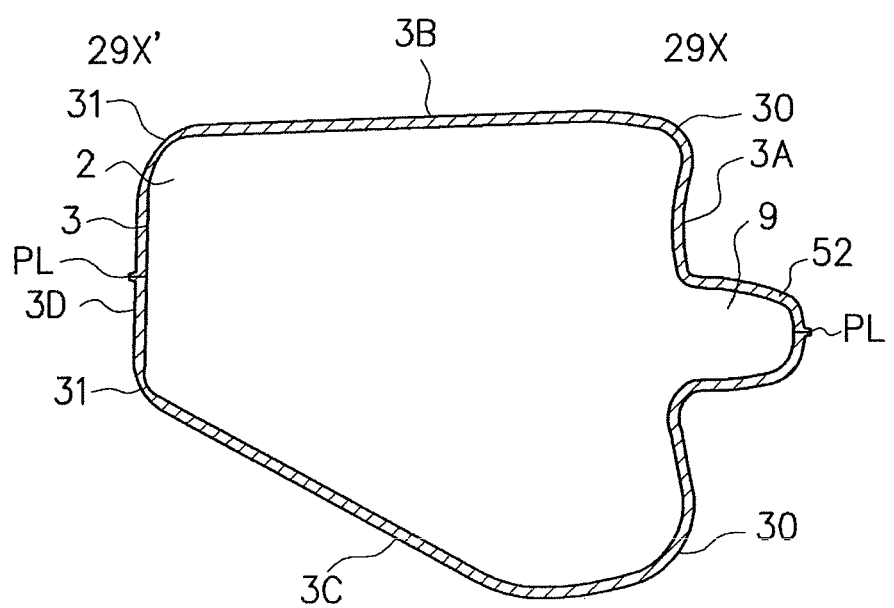
FIG. 29 is a cross-sectional configuration example of the impact absorber 10 shown in FIG. 27, taken on line 29X-29X'.
Figure 30:
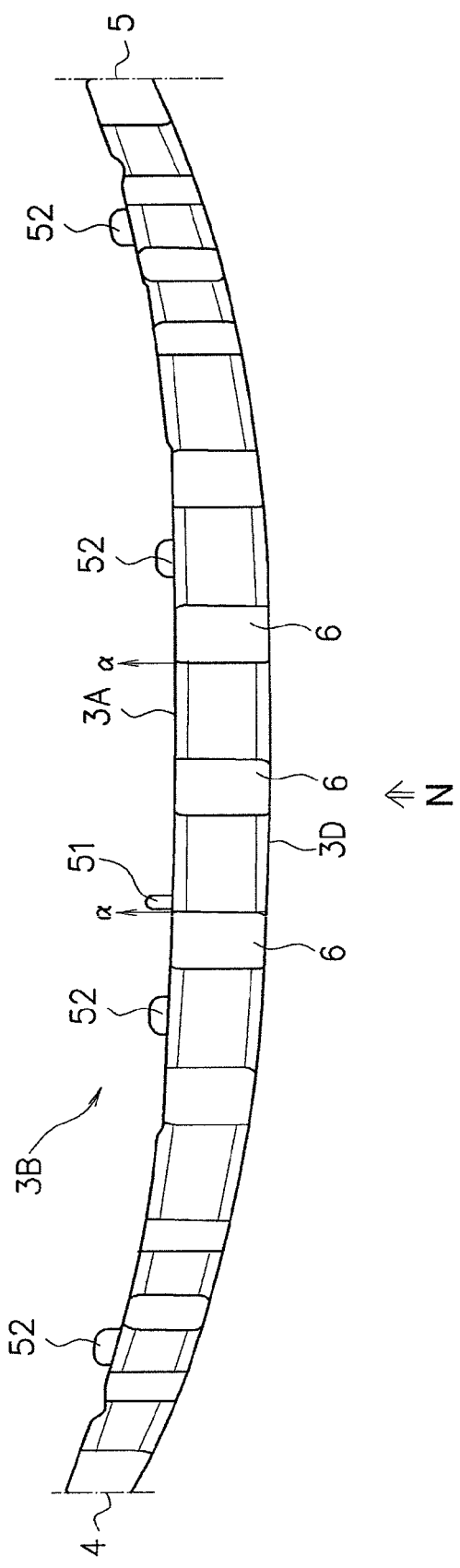
FIG. 30 is a view showing a configuration example of the impact absorber 10 shown in FIG. 27 on the side of the upper wall 3B.
Figure 31:
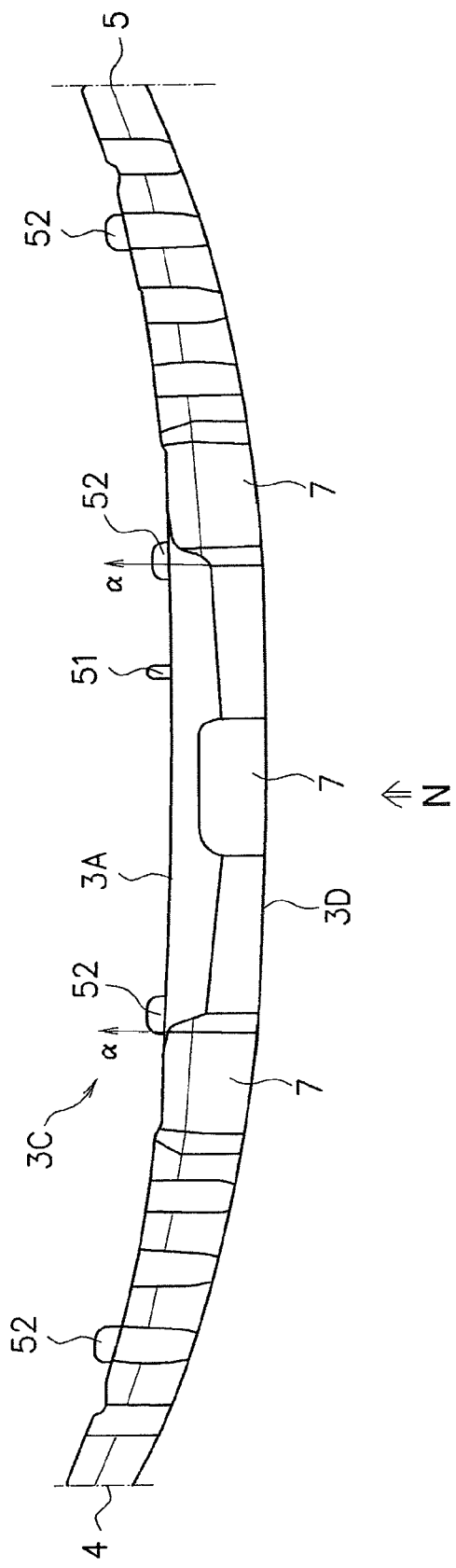
FIG. 31 is a view showing a configuration example of the impact absorber 10 shown in FIG. 27 on the side of the lower wall 3C.
Figure 32:
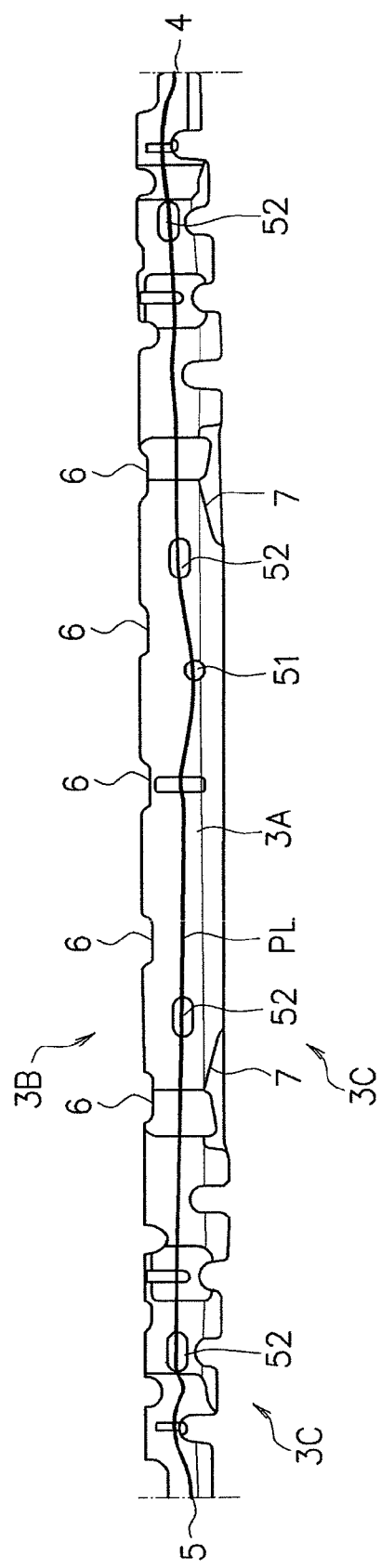
FIG. 32 is a view showing a configuration example of the impact absorber 10 shown in FIG. 27 on the side A (on the side of the rear wall 3A)

A configuration example of the impact absorber 10 according to this embodiment will be described referring to FIGS. 27 to 33. FIG. 27 is a view showing the entire configuration examples of the impact absorber 10 according to this embodiment and the mounting object 20 on which the impact absorber 10 is mounted, FIG. 28 shows a cross-sectional configuration example of the impact absorber 10 shown in FIG. 27, taken on line 28X-28X', and FIG. 29 is a cross-sectional configuration example of the impact absorber 10 shown in FIG. 27, taken on line 298X-29X'. FIG. 30 shows a configuration example of the impact absorber 10 shown in FIG. 27 on the side of the upper wall 3B, and FIG. 31 is a view showing a configuration example of the impact absorber 10 shown in FIG. 27 on the side of the lower wall 3C. FIG. 32 shows a configuration example of the impact absorber 10 shown in FIG. 27 on the side A (on the side of the rear wall 3A), and FIG. 33 is a view showing a configuration example of the impact absorber 10 shown in FIG. 27 on the side D (on the side of the front wall 3D).

The impact absorber 10 according to this embodiment is made by subjecting a thermoplastic resin to blow molding so as to be formed into a hollow shape and has the plurality of groove-shaped ribs 6 and 7 in which the upper wall 3B and the lower wall 3C of the main body 3 having the hollow portion 2, opposed to each other, are formed so as to be dented toward the other respectively as shown in FIG. 28. The groove-shaped ribs 6 and 7 formed on the upper wall 3B and the lower wall 3C extend from the front wall 3D toward the rear wall 3A as shown in FIG. 27; the direction of the extension is preferably the same as the impact direction N. The impact direction N is, for example, the direction of N shown in FIG. 27. Hence, the rigidity against the impact from the impact direction N can be raised.

Figure 33:
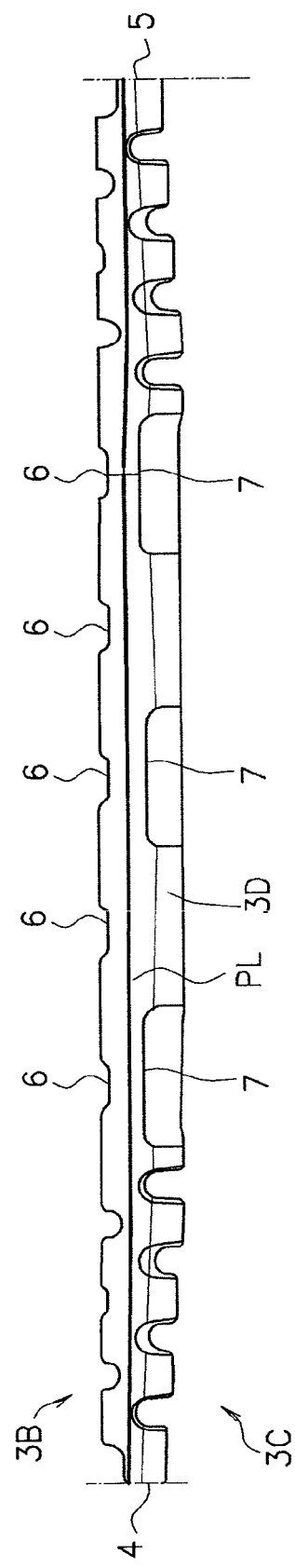
FIG. 33 is a view showing a configuration example of the impact absorber 10 shown in FIG. 27 on the side D (on the side of the front wall 3D)

The impact absorber 10 according to this embodiment is designed to receive impact at the front wall 3D shown in FIG. 33 and transmit the impact received at the front wall 3D to the mounting object 20 via the rear wall 3A opposed to the front wall 3D and shown in FIG. 32. In the impact absorber 10 according to this embodiment, the parting line PL extends in connection with the first side wall 4, the front wall 3D, the second side wall 5 and the rear wall 3A, thereby enhancing the rigidity of the impact absorber 10. Hence, in the case that the front wall 3D receives impact, the impact absorber 10 can be made hardly broken.

Furthermore, as shown in FIG. 33, in the front wall 3D, the parting line PL extends in connection with both ends (on the side of the first side wall 4 and on the side of the second side wall 5), thereby enhancing the rigidity of the front wall 3D. Hence, in the case that the front wall 3D receives impact, the front wall 3D can be made hardly broken.

Moreover, in the front wall 3D, the groove-shaped ribs 6 and 7 are provided so that the distances from the bottom portions of the groove-shaped ribs 6 and 7 to the parting line PL are equal. In the front wall 3D, the thicknesses of the groove-shaped ribs 6 and 7 can be made constant by making the distances from the bottom portions of the groove-shaped ribs 6 provided on the upper wall 3B to the parting line PL equal to the distances from the bottom portions of the groove-shaped ribs 7 provided on the lower wall 3C to the parting line PL. For this reason, even in the case that the position (hitting position) of the load point subjected to impact at the front wall 3D deviates from the ideal position or the entering angle of the impact entering the front wall 3D deviates from the ideal entering angle, the desired load can be maintained stably, and the desired impact absorption amount can be secured. The distances from the bottom portions of the groove-shaped ribs 6 and 7 to the parting line PL are values measured in a state in which the lines connecting the bottom portions of the groove-shaped ribs 6 and 7 to the parting line PL are orthogonal. Besides, the shape of the parting line PL is not limited particularly but can be configured into arbitrary shapes, such as a linear shape and a curved shape, provided that the parting line satisfies the above-mentioned conditions and extends in connection with both side ends.

What's more, as shown in FIGS. 30 and 31, the groove-shaped ribs 6 and 7 extending from the front wall 3D toward the rear wall 3A are formed on the upper wall 3B and the lower wall 3C. The groove-shaped ribs 6 and 7 are configured so that the extension direction α of the groove-shaped ribs 6 and 7 is the same as the impact direction N. The impact direction N is the direction of N shown in FIGS. 30 and 31. Hence, in the case that the front wall 3D receives impact, while the rigidity against the impact is raised, the impact can be absorbed effectively at the groove-shaped ribs 6 and 7. In this embodiment, although the groove-shaped ribs 6 and 7 having a vertically long shape or a horizontally long shape are formed in the extension direction α as shown in FIGS. 30 and 31, the shape of the groove-shaped ribs 6 and 7 is not limited to the vertically long shape or the horizontally long shape, but ribs having any shapes can be formed in the extension direction α. For example, the groove-shaped ribs 6 and 7 having a circular shape can be formed intermittently in the extension direction α. In other words, provided that the ribs are formed in the extension direction α, the shape of the ribs is not limited particularly, and ribs having any shapes can be formed. However, as shown in FIGS. 30 and 31, the ribs are preferably formed continuously in the extension direction α. Hence, the groove-shaped ribs 6 and 7 continuously formed in the extension direction α can be bent so as to become convex in the direction approaching to the upper wall 3B and the lower wall 3C opposed to each other or in the direction away from the upper wall 3B and the lower wall 3C opposed to each other.

Known resins are applicable as the thermoplastic resin constituting the impact absorber 10 according to this embodiment. The impact absorber can be made of resins having high mechanical strength, such as rigidity, for example, polyolefin resins, such as polyethylene and polypropylene; styrene resins, such as polystyrene and ABS resin; polyester resins, such as polyethylene terephthalate; polyamides; and the mixtures of these.

Furthermore, one or two or more kinds of additives being used in the field can be used, for example, fillers such as silica, pigments, dyes, heat stabilizers, light stabilizers, plasticizers, antistatic agents, flame-retardants, fire-proofing agents, aging preventing agents, ultraviolet absorbing agents, antioxidants, antifogging agents and lubricants, in such an range as not to deteriorate the mechanical strength (impact resistance).

As shown in FIG. 32, the impact absorber 10 according to this embodiment is configured so as to have a shaft portion 51 and mounting portions 52 protruding from the rear wall 3A of the main body 3. The shaft portion 51 and the mounting portions 52 constitute a mounting portion for mounting the impact absorber 10 on the mounting object 20. The main body 3 has six walls: the upper wall 3B, the rear wall 3A, the lower wall 3C, the front wall 3D, the first side wall 4 and the second side wall 5, and the upper wall 3B, the first side wall 4, the lower wall 3C and the second side wall 5 constitute the surrounding wall of the main body 3.

As shown in FIG. 27, the impact absorber 10 according to the this embodiment is configured so as to be formed into a shape in which the distance between the first side wall 4 and the second side wall 5 is longer than the distance between the upper wall 3B and the lower wall 3C.

Figure 34:
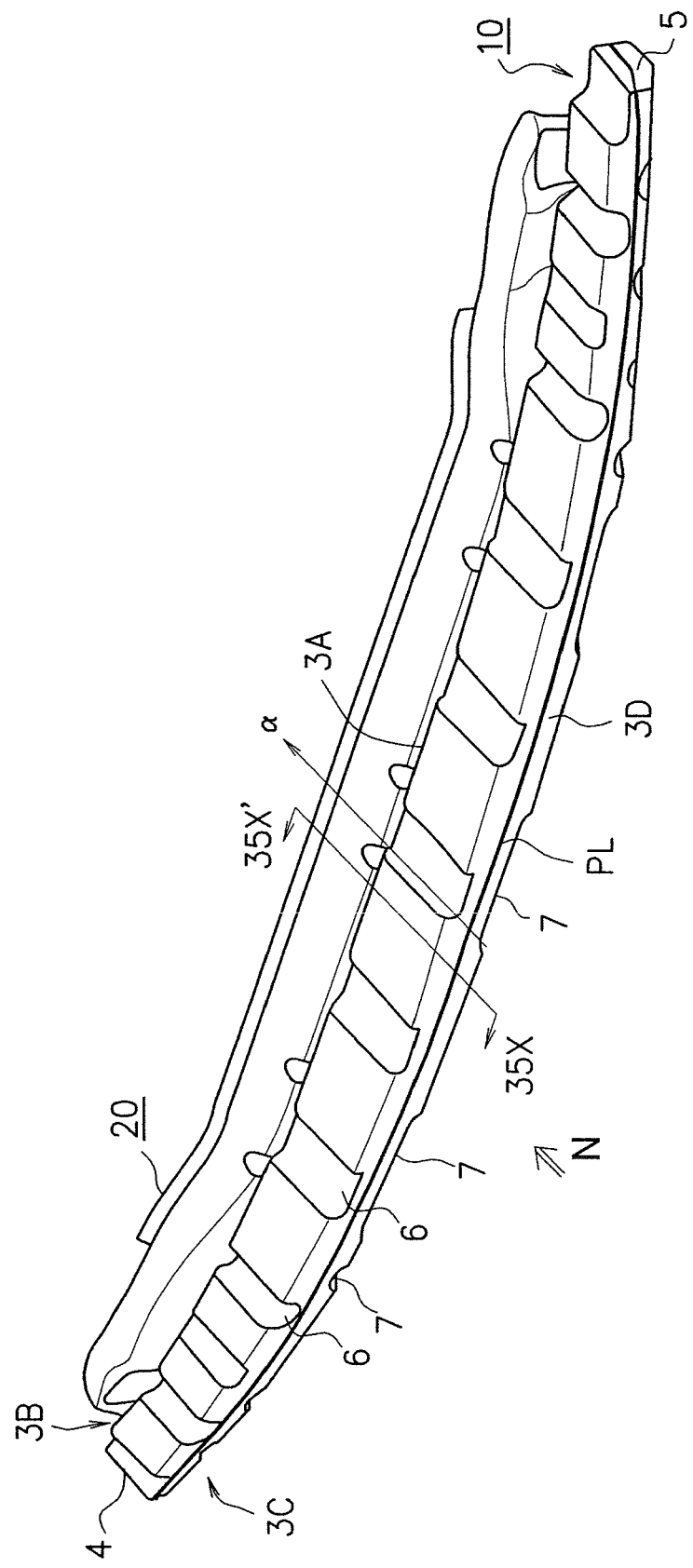
FIG. 34 shows a state as viewed from the side of the front wall 3D of the impact absorber 10 mounted on the mounting object 20.

In the impact absorber 10 according to this embodiment, the shaft portion 51 protruding from the rear wall 3A is inserted into the shaft hole 61 provided in the mounting object 20 and corresponding to the shaft portion 51, and the mounting portions 52 protruding from the rear wall 3A are inserted into the mounting holes 62 provided in the mounting object 20 and corresponding to the mounting portions 52, whereby the main body 3 is configured so as to be mounted on the mounting object 20 as shown in FIG. 34. As a result, the impact absorber 10 can be mounted on the automobile. However, in the case that the impact absorber 10 according to this embodiment is mounted on the automobile, the mounting object 20 is required to be mounted beforehand on a component of the automobile. With this configuration, the impact absorber 10 according to this embodiment can be mounted easily on the automobile without using mounting means, such as small screws and screws.

As shown in FIG. 29, the mounting portions 52 according to this embodiment are formed into a hollow shape by blow molding so as to be high in rigidity. Furthermore, the hollow portions 9 formed inside the mounting portion 52 are integrated with the hollow portion 2 formed inside the main body 3 so that air flows between the hollow portion 2 of the main body 3 and the hollow portions 9 of the mounting portion 52. As in the above-mentioned mounting portion 52, the shaft portion 51 is also formed into a hollow shape by blow molding. The shapes of the mounting portion 52 and the shaft portion 51 according to this embodiment are not limited particularly, but can be formed into arbitrary shapes.

In the impact absorber 10 according to this embodiment, the shaft portion 51 and the mounting portions 52 described above are provided on the parting line PL. With this configuration, the strength of the parting line PL of the rear wall 3A can be improved. As a result, when the impact absorber 10 is subjected to impact, the parting line PL of the rear wall 3A is prevented from breaking, whereby the impact absorbing performance can be ensured.

Moreover, as shown in FIG. 29, the rear wall 3A according to this embodiment has convex portions 30 protruding toward the mounting object (not shown). The convex portions 30 are preferably formed on both sides across the parting line PL (the positions in which the shaft portion 51 and the mounting portions 52 are provided) formed on the rear wall 3A. With this configuration, in the case that the rear wall 3A is mounted on the mounting object, the convex portions 30 formed on the upper and lower sides (on the side of the upper wall 3B and on the side of the lower wall 3C) of the rear wall 3A, instead of the position of the parting line PL (the positions in which the shaft portion 51 and the mounting portions 52 are provided), make contact with the mounting object and support the main body 3, whereby the impact absorber 10 is hardly tilted and the impact absorber 10 can be secured stably to the mounting object. Besides, even in the case that the front wall 3D receives impact, the convex portions 30 formed on the upper and lower sides (on the side of the upper wall 3B and on the side of the lower wall 3C) of the rear wall 3A opposed to the front wall 3D make contact with the mounting object 20, whereby the tilting of the impact absorber 10 in the up-down direction can be prevented.

What's more, as shown in FIG. 29, the impact absorber 10 according to this embodiment has the thin portions 31 at the corner portions for connecting the front wall 3D to the upper and lower walls (the upper wall 3B and the lower wall 3C). The thickness of the thin portions 31 is in the range of 30 to 70% of the average thickness of the wall portions of the impact absorber 10. The thin portions 31 can be formed by adjusting the curved shapes of the corner portions for connecting the front wall 3D to the upper and lower walls (the upper wall 3B and the lower wall 3C). In other words, the corner portions can be made thin by decreasing the radius of curvature of the metal mold for molding the corner portions.

Additionally, as shown in FIG. 28, the impact absorber 10 according to this embodiment has the thin portions 31 at the groove-shaped ribs 6 and 7 formed on the upper wall 3B and the lower wall 3C. In this case, the thin portions 31 can be formed by increasing the stretching amounts of the resin at the portions in which the groove-shaped ribs 6 and 7 are formed. In other words, the thin portions 31 can be formed by making the curved shapes of the metal mold for forming the groove-shaped ribs 6 and 7 sharp (by decreasing the radius of curvature).

The impact absorber 10 according to this embodiment has the corner portions for connecting the front wall 3D to the upper and lower walls (the upper wall 3B and the lower wall 3C) as shown in FIG. 29 and has the thin portions 31 at the groove-shaped ribs 6 and 7 that are formed on the upper and lower walls (the upper wall 3B and the lower wall 3C) as shown in FIG. 28, whereby in the case that the impact absorber 10 receives impact, the thin portions 31 preferentially buckle. As a result, when subjected to impact, the impact absorber 10 starts buckling without repulsing the impact, thereby being capable of effectively absorbing the impact. Furthermore, even in the case that the position (hitting position) of the load point subjected to impact at the front wall 3D deviates from the ideal position or the entering angle of the impact entering the front wall 3D deviates from the ideal entering angle, the thin portions 31 effectively receive the impact, whereby the tilting of the impact absorber 10 in the up-down direction can be prevented.

The average thickness of the wall portions constituting the impact absorber 10 according to this embodiment is preferably in the range of 0.3 to 6.0 mm, and the thickness of the above-mentioned thin portions 31 is preferably in the range of 30 to 70% of the average thickness of the wall portions. With this configuration, the impact absorber can effectively absorb impact.

The average thickness can be calculated as described above.

For example, the cross-sectional thicknesses of the portions (six portions in total) intersecting the perpendicular bisector of the linear lines connecting two metal mold splitting points at three positions (however, positions in which the groove-shaped ribs 6 and 7 are not formed and positions other than the corner portions for connecting the front wall 3D and the upper and lower walls (the upper wall 3B and the lower wall 3C)) of the one end side (on the side of the first side wall 4), the center and the other end side (on the side of the second side wall 5) of the upper and lower walls (the upper wall 3B and the lower wall 3C) shown in FIG. 28 are measured with a caliper, and the average value of the six measurement values is calculated as the average thickness. As a result, the average thickness of the wall portions constituting the impact absorber 10 can be calculated.

When the impact absorber 10 according to this embodiment is mounted on the mounting object 20, the shaft portion 51 is inserted into the mounting shaft hole 61 and the mounting portions 52 are inserted into the mounting holes 62. Hence, as shown in FIGS. 34 and 35, the impact absorber 10 can be mounted on the mounting object 20. FIGS. 34 and 35 show states in which the impact absorber 10 is mounted on the mounting object 20; FIG. 34 shows a state as viewed from the side of the front wall 3D, and FIG. 35 is a view showing a cross-sectional configuration example shown in FIG. 34, taken on line 35X-35X'.

In the impact absorber 10 according to this embodiment, as shown in FIG. 34, the groove-shaped ribs 6 and 7 extending from the front wall 3D toward the rear wall 3A are formed on the upper and lower walls (the upper wall 3B and the lower wall 3C), and the extension direction α of the groove-shaped ribs 6 and 7 is the same as the impact direction N. The impact direction N is, for example, the direction of N shown in FIG. 34. As a result, in the case that the front wall 3D receives impact, while the rigidity against the impact is raised, the impact can be absorbed effectively at the groove-shaped ribs 6 and 7. Although FIG. 34 shows the extension direction α of the groove-shaped rib 6 on the side of the upper wall 3B, the extension direction α of the groove-shaped rib 7 on the side of the lower wall 3C is similar to that on the side of the upper wall 3B.

Furthermore, as shown in FIG. 34, in the front wall 3D constituting the impact absorber 10 according to this embodiment, the parting line PL extends in connection with the side of the first side wall 4 and the side of the second side wall 5, thereby enhancing the rigidity of the front wall 3D. Hence, in the case that the front wall 3D receives impact, the front wall 3D can be made hardly broken. Moreover, in the front wall 3D, the groove-shaped ribs 6 and 7 are provided so that the distances from the bottom portions of the groove-shaped ribs 6 and 7 to the parting line PL are equal. Hence, even in the case that the position (hitting position) of the load point subjected to impact at the front wall 3D deviates from the ideal position or the entering angle of the impact entering the front wall 3D deviates from the ideal entering angle, the desired load can be maintained stably, and the desired impact absorption amount can be secured.

What's more, as shown in FIG. 35, the rear wall 3A of the impact absorber 10 according to this embodiment has convex portions 30 protruding toward the mounting object 20, and the convex portions 30 are formed on the upper and lower sides (on the side of the upper wall 3B and on the side of the lower wall 3C) across the parting line PL (the positions in which the shaft portion 51 and the mounting portions 52 are provided) formed on the rear wall 3A. With this configuration, in the case that the rear wall 3A is mounted on the mounting object 20, the convex portions 30 formed on the upper and lower sides (on the side of the upper wall 3B and on the side of the lower wall 3C) of the rear wall 3A make contact with the mounting object 20 and support the main body 3, whereby the impact absorber 10 is hardly tilted and the impact absorber 10 can be secured stably to the mounting object 20. Besides, even in the case that the front wall 3D receives impact, the convex portions 30 formed on the upper and lower sides (on the side of the upper wall 3B and on the side of the lower wall 3C) of the rear wall 3A make contact with the mounting object 20, whereby the tilting of the impact absorber 10 in the up-down direction can be prevented.

As shown in FIG. 35, the convex portions 30 formed on the upper and lower sides of the rear wall 3A according to this embodiment are configured so that the protruding amounts thereof increase continuously in directions away from the parting line PL (the positions in which the shaft portion 51 and the mounting portions 52 are provided) toward the upper and lower sides (on the side of the upper wall 3B and the lower wall 3C). However, the protruding amount can be configured so as to increase partially. The protruding amount is preferably set so that the angle θ4 formed by the line L1 for connecting the position PL(0) in which the parting line PL is formed on the rear wall 3A to the vertex H in which the convex portion 30 is formed and the demolding direction L2 of the split molds for molding the impact absorber 10 is in the range of 0° to 4°. In the case that the angle θ4 is 0°, the protruding amount becomes 0. In the case that the protruding amounts of both sides across the parting line PL are all 0, the convex portions 30 formed on the upper and lower sides of the rear wall 3A become flat, and the upper and lower surfaces of the rear wall 3A across the parting line PL are positioned on the same plane. Also in this case, the upper and lower sides of the rear wall 3A across the parting line PL make contact with the mounting object 20, whereby the tilting of the impact absorber 10 in the up-down direction can be prevented.

Furthermore, as shown in FIG. 35, the groove-shaped rib 6 according to this embodiment is bent so as to become convex in directions away from the opposed walls (the upper wall 3B and the lower wall 3C), whereby even in the case that the entering angle of the impact entering the front wall 3D is different from the ideal entering angle, impact can be absorbed. The bending angle θ3 of the groove-shaped rib 6 is preferably in the range of 1 to 10°

The groove-shaped rib 6 shown in FIG. 35 is bent in directions (outward directions) away from the lower wall 3C opposed thereto; however, the groove-shaped rib can be configured so as to be bent in directions (inward directions) approaching the lower wall 3C opposed thereto. Furthermore, the groove-shaped rib 6 shown in FIG. 35 is formed so that the depth h1 of the groove-shaped rib 6 near the center thereof is deeper than the depth h2 of the groove-shaped rib 6 on the side of the rear wall 3A and also deeper than the depth h3 of the groove-shaped rib 6 on the side of the front wall 3D (h1<h2 and h1<h3). However, the depth of the groove-shaped rib 6 can be set to the same depth h1 in the range from the front wall 3D to the region near the center and the depth h2 of the groove-shaped rib 6 on the rear wall 3A is made deeper (h1<h2). In the case that the groove-shaped rib 6 provided on the upper wall 3B serving as the surrounding wall for connecting the front wall 3D to the rear wall 3A is bent, the bent portion can effectively absorb impact. Although the groove-shaped rib 6 shown in FIG. 35 is a configuration example in which the rib is bent at the region near the center between the rear wall 3A and the front wall 3D, the position of the bent portion is not limited to the region near the center, but a configuration example is possible in which the groove-shaped rib is bent at an arbitrary position. The groove-shaped rib 7 provided on the side of the lower wall 3C is also configured so as to be bent in a way similar to the above-mentioned groove-shaped rib 6 provided on the side of the above-mentioned upper wall 3B.

The above-mentioned impact absorber 10 is configured so that the groove-shaped rib 6 provided on the side of the upper wall 3B and the groove-shaped rib 7 provided on the side of the lower wall 3C are respectively disposed at different positions. However, the groove-shaped rib 6 provided on the side of the upper wall 3B and the groove-shaped rib 7 provided on the side of the lower wall 3C can be configured so as to be opposed to each other at the same positions. Even in this configuration, the groove-shaped ribs 6 and 7 are preferably provided so that the distances from the bottom portions of the groove-shaped ribs 6 and 7 to the parting line PL are equal. With this configuration, even in the case that the position (hitting position) subjected to impact at the front wall 3D deviates from the ideal position or the entering angle of the impact entering the front wall 3D is different from the ideal entering angle, the desired load can be maintained stably, whereby the desired impact absorption amount can be secured.

<Actions and Effects of the Impact Absorber 10 According to this Embodiment>

As described above, the impact absorber 10 according to this embodiment is configured so as to have the front wall 3D for receiving impact, the rear wall 3A opposed to the front wall 3D, the surrounding walls (the upper wall 3B, the first side wall 4, the lower wall 3C, and the second side wall 5) for connecting the circumferences of the front wall 3D and the rear wall 3A, and the parting line PL passing through the front wall 3D and the rear wall 3A, and as shown in FIG. 29, the thin portions 31 are formed at the corner portions for connecting the front wall 3D to the surrounding walls 3B and 3C. Furthermore, as shown in FIG. 27, the groove-shaped ribs 6 and 7 extending from the front wall 3D toward the rear wall 3A are formed on the surrounding walls 3B and 3C, and as shown in FIG. 28, the thin portions 31 are formed at the groove-shaped ribs 6 and 7.

Hence, even if the impact receiving portion of the impact absorber 10 deviates from the desired position, the thin portions 31 of the wall portions constituting the impact absorber 10 preferentially buckle. As a result, even if the impact receiving portion of the impact absorber 10 deviates from the desired position, the impact absorber 10 can effectively absorb the impact.

In the above-mentioned embodiment, the mounting portions 52 of the impact absorber 10 are inserted into the mounting holes 62 provided in the mounting object 20. However, the configuration of the mounting object 20 can be formed beforehand so as to be used for an automobile component and the impact absorber 10 can be directly mounted on the automobile component (the mounting object). For example, it is possible that the mounting holes 62 are formed beforehand in the automobile component, and the mounting portions 52 of the impact absorber 10 are directly mounted on the automobile component (the mounting object).

The above-mentioned embodiments are preferable embodiments according to the present invention, but the scope of the present invention is not limited to only the above-mentioned embodiments, and various modifications can be made in a range not departing from the gist of the present invention.

With the above-mentioned embodiments, the present disclosure includes impact absorbers having the following aspects.

As shown in FIG. 2, the impact absorber 10 according to the present disclosure has the front wall 3D for receiving impact, the rear wall 3A opposed to the front wall 3D, and the surrounding walls (corresponding to the upper wall 3B, the first side wall 4, the lower wall 3C and the second side wall 5) for connecting the circumferences of the front wall 3D and the rear wall 3A, wherein the groove-shaped ribs 6 and 7 extending from the front wall 3D toward the rear wall 3A are formed on the surrounding walls 4 and 4 as shown in FIG. 16, and the groove-shaped ribs 6 and 7 are bent. As shown in FIG. 16, in the impact absorber 10 according to the present disclosure, since the groove-shaped ribs 6 and 7 extending from the front wall 3D toward the rear wall 3A are formed on the surrounding walls 4 and 5 and the groove-shaped ribs 6 and 7 are bent, even in the case that the impact receiving position of the impact absorber 10 deviates from a desired position, impact can be absorbed effectively at the bent portions of the groove-shaped ribs 6 and 7. As a result, even in the case that the impact receiving position of the impact absorber 10 deviates from the desired position, impact can be absorbed effectively.

Furthermore, as shown in FIG. 2, in the impact absorber 10 according to the present disclosure, the parting line PL is formed so as to extend in connection with one end (corresponding to the side of the upper wall 3B) and the other end (corresponding to the side of the lower wall 3C) of the mounting wall (corresponding to the rear wall 3A) to be mounted on the mounting object 20, and as shown in FIG. 16, the mounting wall 3A has the convex portions 30 protruding toward the mounting object 20 at positions different from the parting line PL. Moreover, in the impact absorber 10 according to the present disclosure, the surfaces of the mounting wall 3A on both sides across the parting line PL are positioned on the same plane. Since the impact absorber 10 according to the present disclosure is configured so that the mounting wall 3A has the convex portions 30 protruding toward the mounting object 20, in the case that the impact absorber 10 is subjected to impact, the convex portions 30 make contact with the mounting object 20, whereby the impact absorber 10 can be made hardly tilted. In addition, since the impact absorber 10 according to the present disclosure is configured so that the surfaces of the mounting wall 3A on both sides across the parting line PL are positioned on the same plane, in the case that the impact absorber 10 is subjected to impact, the surfaces of the mounting wall 3A on both sides across the parting line PL make contact with the mounting object 20, whereby the impact absorber 10 can be made hardly tilted.

Furthermore, as shown in FIG. 2, the impact absorber 10 according to the present disclosure has the main body 3, the shaft portion 11 protruding from the main body 3, and the come-off preventing portions 12 and 13 protruding from the main body 3, wherein the come-off preventing portions 12 and 13 have the restricting portions 12b and 13b for restricting the shaft portion 11 from coming off from the shaft hole 21 since the restricting portions 12b and 13b are overlapped with the mounting object 20 when the shaft portion 11 is inserted into the shaft hole 21 provided in the mounting object 20 as shown in FIG. 12 and the main body 3 is rotated as shown in FIG. 13. In the case of the impact absorber 10 configured so as to have the shaft portion 11 and the come-off preventing portions 12 and 13 as in the above-mentioned configuration example, at least one of the come-off preventing portions 12 and 13 may merely be used. Moreover, as shown in FIG. 2, the impact absorber 10 according to the present disclosure has the main body 3 and the plurality of come-off preventing portions 12 and 13 protruding from the main body 3, wherein the come-off preventing portions 12 and 13 have the restricting portions 12b and 13b for restricting the come-off preventing portions 12 and 13 from coming off from the mounting holes 22 and 23 since the restricting portions 12b and 13b are overlapped with the mounting object 20 when the come-off preventing portions 12 and 13 are inserted into the mounting holes 22 and 23 as shown in FIG. 12 and the main body 3 is rotated so that the come-off preventing portions 12 and 13 are moved along the regions of the mounting holes 22 and 23 as shown in FIG. 13. In the case of the impact absorber 10 configured so as to have the plurality of come-off preventing portions 12 and 13 as in the above-mentioned configuration example, at least two of the come-off preventing portions 12 and 13 may merely be used. In the impact absorber 10 according to the present disclosure, when the main body 3 is rotated, the shaft portion 11 can be restricted from coming off from the shaft hole 21, and the come-off preventing portions 12 and 13 can be restricted from coming off from the mounting holes 22 and 23. As a result, the impact absorber 10 according to the present disclosure does not require mounting means, and the mounting work thereof can be made easy.

DESCRIPTION OF REFERENCE NUMERALS

10 Impact Absorber
2, 8, 9 Hollow portion
3 Main body
3A Rear wall
3B Upper wall (surrounding wall)
3C Lower wall (surrounding wall)
3D Front wall
4 First side wall (surrounding wall)
5 Second side wall (surrounding wall)
6, 7 Groove-shaped rib
PL Parting line
CP Compression portion
11, 51 Shaft portion
12, 13 Come-off preventing portion
12a, 13a Shaft portion
12b, 13b End portion
12c, 13c Thin portion (burr)
14, 15 Engagement portions
20 Mounting object
21, 61 Shaft hole
22, 23, 62 Mounting hole
24, 25 Engagement hole
30 Convex portion
31 Thin portion
52 Mounting portion
100 Automobile

The invention claimed is:
1. A knee bolster comprising:
a front wall for receiving an impact;
a mounting wall to be mounted on a mounting object and opposed to the front wall;
surrounding walls that comprise a first side wall, a second side wall, a third side wall, and a fourth side wall for connecting the circumferences of the front wall and the mounting wall; and
a parting line passing through the front wall, the mounting wall, the first side wall, and the second side wall,
wherein the first side wall and the second side wall, and the third side wall and the fourth side wall oppose each other,
wherein groove-shaped ribs extending from the front wall toward the mounting wall are formed on the third side wall and the fourth side wall so that a predetermined angle θ is formed between an extension direction α of the groove-shaped ribs and a perpendicular direction β perpendicular to a surface of the mounting wall, and the groove-shaped ribs extend in a direction inclined with respect to the perpendicular direction β, and
wherein the ribs comprise first groove-shaped ribs connected to the front wall, second groove-shaped ribs connected to the mounting wall, and connection portions that connect the first ribs and the second ribs, and the ribs are bent at the connection portions.

2. The knee bolster according to claim 1, wherein the ribs are bent between the front wall and the mounting wall so as to become convex in directions away from the third side walls or the fourth side wall opposed to each other.

3. The knee bolster according to claim 2, the first groove-shaped rib and the second groove-shaped rib are disposed plane-symmetrically in the region of the connection portion.

4. The knee bolster according to claim 1, wherein the mounting wall has convex portions protruding toward the mounting object at positions different from the parting line and on both sides across the parting line, and
wherein the length of the mounting wall in a shorter direction is shorter than the maximum distance from the mounting wall to the front wall.

5. The knee bolster according to claim 4, wherein the convex portions are formed so that the protruding amounts thereof increase continuously in directions away from the parting line.

6. The knee bolster according to claim 4, comprising:
a shaft portion protruding from the mounting wall, and
come-off preventing portions protruding from the mounting wall, the come-off preventing portions comprising:
restricting portions for restricting the shaft portion from coming off from a shaft hole provided in the mounting object by overlapping with the mounting object when the shaft portion is inserted into the shaft hole and the knee bolster is rotated, and
engagement portions for restricting the rotation of the knee bolster in the opposite direction when the shaft portion is inserted into the shaft hole and the knee bolster is rotated,
wherein the shaft portion and the come-off preventing portions are formed into a hollow shape.

7. The knee bolster according to claim 1, comprising:
a shaft portion protruding from the mounting wall, and
come-off preventing portions protruding from the mounting wall,
the come-off preventing portions comprising:
restricting portions for restricting the shaft portion from coming off from a shaft hole provided in the mounting object by overlapping with the mounting object when the shaft portion is inserted into the shaft hole and the knee bolster is rotated, and
engagement portions for restricting the rotation of the knee bolster in the opposite direction when the shaft portion is inserted into the shaft hole and the knee bolster is rotated,
wherein the shaft portion and the come-off preventing portions are formed into a hollow shape.

8. The knee bolster according to claim 7, wherein the parting line extends in connection with the shaft portion and the come-off preventing portions.

9. The knee bolster according to claim 1, comprising:
a shaft portion protruding from the mounting wall, and
come-off preventing portions protruding from the mounting wall,
the come-off preventing portions comprising:
restricting portions for restricting the shaft portion from coming off from a shaft hole provided in the mounting object by overlapping with the mounting object when the shaft portion is inserted into the shaft hole and the knee bolster is rotated, and
wherein the shaft portion is positioned between the come-off preventing portions, and the distance between one of the come-off preventing portions and the shaft portion is different from the distance between the other come-off preventing portion and the shaft portion.

10. The knee bolster according to claim 1, comprising:
come-off preventing portions protruding from the mounting wall,
the come-off preventing portions comprising:
restricting portions for restricting the come-off preventing portions from coming off from a mounting hole provided in the mounting object by overlapping with the mounting object when the come-off preventing portions are inserted into the mounting hole and the knee bolster is rotated, and
wherein thin portions are provided between the restricting portions and the mounting wall, and the mounting object deforms the thin portions and the restricting portions are overlapped with the mounting object when the knee bolster is rotated.

11. A method for manufacturing knee bolster according to claim 1, comprising:
extruding a thermoplastic resin between split molds in a direction that the front wall and the mounting wall oppose each other,
subjecting the thermoplastic resin to blow molding, and
demolding the split molds in a direction orthogonal to a direction that the front wall and the mounting wall are opposing each other,
wherein the knee bolster comprising:
thin portions that are formed at corners for connecting the front wall and the side walls.

12. The method for manufacturing a knee bolster according to claim 11,
wherein the thickness of the thin portions is in the range of 30 to 70% of the average thickness of the wall portions of the knee bolster.

13. The method for manufacturing a knee bolster according to claim 11, wherein the thin portions are formed at the ribs.

14. The knee bolster according to claim 1,
wherein depth of the ribs is smallest at the connection portions.

15. The knee bolster according to claim 1,
wherein the first groove-shaped ribs and the second groove-shaped ribs are integrally molded to connect to the connecting portions without welding.

16. A knee bolster comprising:
a front wall for receiving an impact;
a mounting wall to be mounted on a mounting object and opposed to the front wall;
surrounding walls that comprise a first side wall, a second side wall, a third side wall, and a fourth side wall for connecting the circumferences of the front wall and the mounting wall; and
a parting line passing through the front wall, the mounting wall, the first side wall, and the second side wall,
wherein the first side wall and the second side wall, and the third side wall and the fourth side wall oppose each other,
wherein groove-shaped ribs extending from the front wall toward the mounting wall are formed on the third side wall and the fourth side wall so that a predetermined angle θ is formed between an extension direction α of the groove-shaped ribs and a perpendicular direction β perpendicular to a surface of the mounting wall, and the groove-shaped ribs extend in a direction inclined with respect to the perpendicular direction β.

* * * * *